(12) United States Patent
Boss et al.

(10) Patent No.: US 7,199,970 B2
(45) Date of Patent: Apr. 3, 2007

(54) DAMPED DISC DRIVE ASSEMBLY, AND METHOD FOR DAMPING DISC DRIVE ASSEMBLY

(75) Inventors: Daniel E. Boss, Grayslake, IL (US); Richard K. Williams, Aurora, IL (US)

(73) Assignee: Material Sciences Corporation, Elk Grove Village, IL (US)

( * ) Notice: Subject to any disclaimer, the term of this patent is extended or adjusted under 35 U.S.C. 154(b) by 525 days.

(21) Appl. No.: 10/698,937

(22) Filed: Nov. 3, 2003

(65) Prior Publication Data

US 2005/0094311 A1 May 5, 2005

(51) Int. Cl.
*G11B 33/14* (2006.01)
(52) U.S. Cl. .................................... 360/97.02
(58) Field of Classification Search ............ None
See application file for complete search history.

(56) References Cited

U.S. PATENT DOCUMENTS

| | | | |
|---|---|---|---|
| 3,640,836 A | 2/1972 | Oberst et al. | |
| 3,833,404 A * | 9/1974 | Sperling et al. | 428/413 |
| 4,412,864 A | 11/1983 | Kurashige et al. | |
| 4,447,493 A | 5/1984 | Driscoll et al. | |
| 4,742,107 A | 5/1988 | Statz | |
| 4,822,834 A | 4/1989 | Blevins | |
| 4,838,939 A | 6/1989 | Kanda et al. | |
| 4,859,523 A | 8/1989 | Endoh et al. | |
| 4,942,219 A | 7/1990 | Yatsuka et al. | |
| 4,959,189 A | 9/1990 | Rohrbacher et al. | |
| 4,965,037 A | 10/1990 | Weaver et al. | |
| 5,009,821 A | 4/1991 | Weaver | |
| 5,087,491 A | 2/1992 | Barrett | |
| 5,203,435 A | 4/1993 | Dolgin | |
| 5,229,216 A | 7/1993 | Watanabe et al. | |
| 5,262,232 A | 11/1993 | Wilfong et al. | |
| 5,282,100 A | 1/1994 | Tacklind et al. | |
| 5,288,813 A | 2/1994 | Hirakouchi et al. | |
| 5,342,465 A | 8/1994 | Bronowicki et al. | |
| 5,356,715 A | 10/1994 | Levine et al. | |
| 5,362,572 A | 11/1994 | Hamada et al. | |
| 5,368,914 A | 11/1994 | Barrett | |
| 5,411,810 A | 5/1995 | Hirakouchi et al. | |
| 5,420,170 A | 5/1995 | Lutter et al. | |
| 5,507,477 A | 4/1996 | Manning et al. | |
| 5,540,173 A | 7/1996 | Tucker et al. | |
| 5,578,680 A | 11/1996 | Ando et al. | |
| 5,609,703 A | 3/1997 | Hamada et al. | |
| 5,695,867 A * | 12/1997 | Saitoh et al. | 428/219 |
| 5,725,937 A * | 3/1998 | Johnston | 428/209 |

(Continued)

*Primary Examiner*—David Davis
(74) *Attorney, Agent, or Firm*—Berenato, White & Stavish

(57) ABSTRACT

A disc drive assembly is provided including a head disc assembly, a housing having a base and a cover cooperating with one another to form a chamber in which the head disc assembly is housed, and a damper structure in operative association with the housing for dampening noise and/or vibration emanated from the head disc assembly. The damper structure includes a viscoelastic damper layer and a continuous, polymeric constraining layer intimately contacting and encasing the viscoelastic damper layer. The constraining layer has a greater stiffness and higher modulus of dynamic shearing elasticity than the viscoelastic damper layer, and is molded from a high density filler and a moldable compound that is immiscible with the viscoelastic damper layer to provide a discrete interface between the constraining layer and the viscoelastic damper layer.

32 Claims, 16 Drawing Sheets

U.S. PATENT DOCUMENTS

| | | |
|---|---|---|
| 5,800,888 A | 9/1998 | Yasumoto et al. |
| 5,833,320 A | 11/1998 | Kaneko et al. |
| 5,842,686 A | 12/1998 | Hansen et al. |
| 5,851,327 A | 12/1998 | Landin |
| 5,858,521 A | 1/1999 | Okuda et al. |
| 5,916,954 A | 6/1999 | Bohn et al. |
| 5,918,564 A | 7/1999 | Ohtsuka et al. |
| 5,939,179 A | 8/1999 | Yano et al. |
| 5,945,643 A | 8/1999 | Casser |
| 5,965,249 A | 10/1999 | Sutton et al. |
| 5,984,043 A | 11/1999 | Ruhe et al. |
| 6,048,426 A | 4/2000 | Pratt |
| 6,108,825 A | 8/2000 | Bell et al. |
| 6,130,284 A | 10/2000 | Singh |
| 6,155,932 A | 12/2000 | Cabales et al. |
| 6,177,173 B1 | 1/2001 | Nelson |
| 6,202,217 B1 | 3/2001 | Karall |
| 6,202,462 B1 | 3/2001 | Hansen et al. |
| 6,245,419 B1 | 6/2001 | Hakotani et al. |
| 6,529,345 B1 | 3/2003 | Butler et al. |
| 6,536,555 B1 | 3/2003 | Kelsic et al. |
| 6,879,466 B1 * | 4/2005 | Oveyssi et al. .......... 360/265.7 |
| 6,958,890 B1 * | 10/2005 | Lin et al. ................. 360/244.6 |

* cited by examiner

DAMPED DISC DRIVE ASSEMBLY, AND METHOD FOR DAMPING DISC DRIVE ASSEMBLY

CROSS-REFERENCE TO RELATED APPLICATION

This application relates to co-pending application entitled "Sheet Molding Compound Damper Component, and Methods for Making and Using the Same, which has been filed on the same date and assigned to the same assignee as this application.

BACKGROUND OF THE INVENTION

1. Field of the Invention

The present invention relates to disc drive assemblies, especially for computer hard drives, and to methods for damping disc drive assemblies.

2. Description of the Related Art

Disc drive units are well known in the art as data storage devices capable of storing a large amount of information input into and generated by computers. FIG. 17 shows a conventional disc drive unit 100, such as shown in U.S. Pat. No. 6,529,345 and in U.S. Pat. No. 5,282,100. The disc drive unit includes a housing comprising a top cover mountable over and cooperating with a base 106 to establish an internal, sealed chamber. The cover comprises an inner layer 102 and an outer layer 104. Sealed inside of the chamber is a head-disc assembly comprising one or more circular discs 108 stacked yet spaced apart from one another on a spindle motor hub, which is rotatably driven by a spindle motor (not shown). The spindle motor may be fixed to the base and/or cover of the housing. The head-disc assembly further comprises a plurality of read/write heads 114, with one head 114 provided for each disc 108. The read/write head 114 transfers electronic data between the tracks on the discs 108 and the external environment, e.g., a computer monitor or printer. In the write mode, the head 114 writes data (input through an input source, such as a computer key board or scanner) onto the tracks of the disc 108. In the read mode, the head 114 retrieves stored information from the disc tracks for relaying the information to an output source, such as a display monitor, printer, or other storage medium.

Data and other information are stored over a majority of the surface of the rotatable disc or discs and, accordingly, are not accessible unless the head 114 moves sufficiently to reach a majority of the disc surface. To permit head 114 movement, the disc-head assembly further comprises one or more actuator arms 110 and actuator (e.g., voice coil) motors 112 for moving the head 114 radially across the disc surface to a desired location adjacent the disc surface. Actuator arms and motors may be arranged in a wide variety of designs and configurations known and practiced in the art. In the illustrated device, the actuator arms 110 turn about a pivot bearing assembly. The pivot bearing assembly includes a stationary element such as a pivot journal fixed to the disc drive housing at the base and cover to define and stabilize a pivot axis. The actuator arms 110 move in response to energizing currents sent from the motors 112, which moves the disc-head assembly on the pivot axis, swinging the actuator arms 110 to move the head 114 radially relative to the disc 108 surface.

Movements of the disc-head assembly, and in particular the actuator arms 110, tend to be relatively rapid and may cause the disc-head assembly to vibrate. The vibration tends to be transferred to the disc drive housing. The cover, and in some cases the base, of the disc drive housing commonly have a relative large surface area, which when vibrated, may radiate acoustic noise. In some cases, the cover may act as a speaker-like structure, producing undesirably high levels of acoustic noise. Additionally, operation of the spindle motor and rotation of the discs at high speeds (such as 7200 rpm) and airflow noise generated by the spinning discs contribute to the vibration and noise. Under some operating conditions, the acoustic noise may be sufficient to disturb or aggravate the user.

In order to dampen the vibration and acoustic noise generated during operation of the disc drive unit, the outer layer 104 of the cover may be attached to the inner layer 102 using a mechanical isolation and sound-damping material, such as adhesive coated foam rubber. However, the sound-damping adhesive is not considered sufficient under some operational conditions for adequately attenuating the vibrations and acoustic noise.

Acoustic dampers have also been made from a constraining layer of metal, such as steel, adhered to the surface of the disc drive housing by a viscoelastic damping adhesive. An acoustic damper is disclosed in U.S. Pat. No. 6,536,555, which discloses an acoustic damper comprising a plurality of damping adhesive strips and constraining layers in alternating relationship. The adhesive strips have temperature-dependent damping efficiencies exhibiting optimal damping properties at different temperature ranges from one another. The '555 patent discloses that the constraining layers are preferably made of stainless steel, aluminum, mica, or polycarbonate hard plastic material.

Laminates as described in the '555 patent have several drawbacks. In order to place the viscoelastic adhesive in direct contact with the disc drive housing and maximize performance, the viscoelastic adhesive and the constraining layer are preferably molded or otherwise shaped to match the surface contours of the disc drive housing. However, the use of laminates comprising viscoelastic layers and metallic skins is often accompanied by design tradeoffs. For example, metallic skins and viscoelastic layers generally lack sufficient moldability or malleability to allow them to be fabricated for and mounted, in continuous intimate contact, to disc drive units having complex shapes. Accordingly, parts or portions of a disc drive unit that are not or cannot be associated with a damper layer, for example, due to the complex shape of the device, can adversely affect dampening effectiveness. Although polycarbonate has better moldability than steel, polycarbonate has inferior physical properties, such as a relatively low modulus of dynamic shearing elasticity of about 350,000 psi and a relatively low density of about 1.2 g/cc. Mica likewise has a low density, is highly brittle, and is not readily formable or shapeable into complex shapes.

Accordingly, it would be a significant improvement in the art to provide a disc drive assembly comprising a damper structure that is sufficiently moldable or shapeable to avoid significant design tradeoffs, and possesses desirable physical properties.

3. Objects of the Invention

Accordingly, it is an object of the present invention to provide a damper structure that is readily formable into a desired shape, including a complex shape, for permitting placement of the damper structure in intimate contact with a disc drive unit.

It is another object of the present invention to provide a damper structure having excellent physical properties for damping and withstanding the stresses imparted by a disc drive unit.

It is another object of the present invention to provide a method for damping a disc drive assembly, including a method for making disc drive assemblies that achieve one or more of the above-discussed objects.

It is still a further object of the present invention to provide a method for retrofitting an existing disc drive assembly to include a damper structure according to the present invention.

SUMMARY OF THE INVENTION

To achieve one or more of the foregoing objects, and in accordance with the purposes of the invention as embodied and broadly described in this document, according to a first aspect of this invention there is provided a disc drive assembly comprising a head disc assembly, a housing, and a damper structure. The head disc assembly comprises a disc having a surface and a track for storage of information, a head for writing and reading information to and from the disc, and an actuator arm for moving the head relative to the surface of the disc. The housing comprises a base and a cover cooperating with one another to form a chamber therebetween in which at least a portion of the head disc assembly is housed. The damper structure is operatively associated with the housing, and more preferably contacts the housing, for damping noise and/or vibration emanated from the head disc assembly. The damper structure comprises a viscoelastic damper layer, and a continuous, polymeric constraining layer intimately contacting and encasing the viscoelastic damper layer. The constraining layer has a greater stiffness and higher modulus of dynamic shearing elasticity than the viscoelastic damper layer, and is molded from a high density filler and a moldable compound that is immiscible with the viscoelastic damper layer to provide a discrete interface between the constraining layer and the viscoelastic damper layer.

According to a second aspect of this invention, there is provided a disc drive assembly comprising a head disc assembly, a housing, and a damper structure. The head disc assembly comprises a disc having a surface and a track for storage of information, a head for writing and reading information to and from the disc, and an actuator arm for moving the head relative to the surface of the disc. The housing comprises a base and a cover cooperating with one another to form a chamber therebetween in which at least a portion of the head disc assembly is housed. The damper structure is operatively associated with the housing for dampening noise and/or vibration emanated from the head disc assembly. The damper structure of this second aspect comprises a viscoelastic damper layer, and a continuous, polymeric constraining layer intimately contacting the viscoelastic damper layer and molded from a high density filler and a moldable compound that is immiscible with the viscoelastic damper layer to provide a discrete interface between the constraining layer and the viscoelastic damper layer. The constraining layer has a greater stiffness than the viscoelastic damper layer, a modulus of dynamic shearing elasticity of at least 500,000 psi and higher than the viscoelastic damper layer, and a density of at least 3.0, more preferably at least 5.0 grams per cubic centimeter.

According to a third aspect of the invention, there is provided a method for damping a disc drive assembly comprising a head disc assembly and a housing. The head disc assembly comprises a disc having a surface and a track for storage of information, a head for writing and reading information to and from the disc, and an actuator arm for moving the head relative to the surface of the disc. The housing comprises a base and a cover cooperating with one another to form a chamber therebetween in which at least a portion of the head disc assembly is housed. A curable compound is heat molded in a mold cavity of a mold in the presence of a viscoelastic damper layer that is substantially immiscible with the curable compound, and cured into a continuous, polymeric constraining layer of a damper structure, the damper structure comprising the constraining layer in intimate contact with and encasing the viscoelastic damper layer. The constraining layer has a greater stiffness and higher modulus of dynamic shearing elasticity than the viscoelastic damper layer. According to this aspect of the invention, the damper structure is placed in operative association with the housing to dampen resonation of noise and/or vibration generated by the head disc assembly.

According to a fourth aspect of the invention, there is provided a method for damping a disc drive assembly comprising a head disc assembly and a housing. The head disc assembly comprises a disc having a surface and a track for storage of information, a head for writing and reading information to and from the disc, and an actuator arm for moving the head relative to the surface of the disc. The housing comprises a base and a cover cooperating with one another to form a chamber therebetween in which at least a portion of the head disc assembly is housed. The method further comprises heat molding a curable compound in a mold cavity of a mold, and curing the curable compound into a continuous, polymer constraining layer. A damper structure comprising the polymer constraining layer layer in intimate contact with a viscoelastic damper layer is prepared. The viscoelastic damper layer may be either applied to the molded polymer constraining layer, or included in the mold cavity during molding. If included in the mold cavity, the viscoelastic damper layer is preferably substantially immiscible with the curable compound. The constraining layer has a greater stiffness than the viscoelastic damper layer, a modulus of dynamic shearing elasticity of at least 500,000 psi and higher than the viscoelastic damper layer, and a density of at least 3.0, more preferably at least 5.0 grams per cubic centimeter. The method further comprises positioning the damper structure in operative association with the housing to dampen resonation of noise and/or vibration generated by the head disc assembly.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
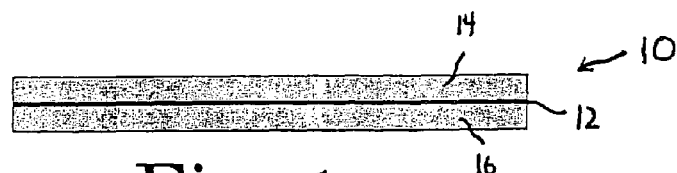
FIG. 1 is a cross-sectional view illustrating a damper precursor laminate according to an embodiment of the invention.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise. For example, a damper structure comprising "a damper layer" and "a constraining layer" may include one or more damper layers and one or more constraining layers, unless the context clearly dictates otherwise.

FIG. 1 is a cross-sectional view illustrating a damper precursor laminate, that is, a laminate prior to being mold processed into a damper structure of an embodiment of the present invention. The damper precursor laminate comprises a body, generally designated by reference numeral 10. The laminate body 10 of the illustrated embodiment optionally may be rolled into substantially cylindrical stock for accommodating storage of the stock. The laminate body 10 comprises a viscoelastic sheet 12 interposed between a first curable sheet 14 and a second curable sheet 16. As will be discussed in greater detail below, the first and second curable sheets 14 and 16 are preferably B-stage polymers, that is, polymer matrixes in a partially cured state, capable of being molded and cured together under suitable temperature and/or pressure to form a solid, polymeric, continuous constraining layer. In the embodiment of FIG. 1, the viscoelastic sheet 12 and the first and second curable sheets 14 and 16 of the laminate body 10 each comprise a respective continuous, non-fragmented body at this stage in processing. The illustrated B-stage sheets 12 and 14 are not exhaustive of the scope of the invention. For example, the curable sheets may be introduced into the mold cavity in an uncured or substantially uncured liquid state.

Figure 2:
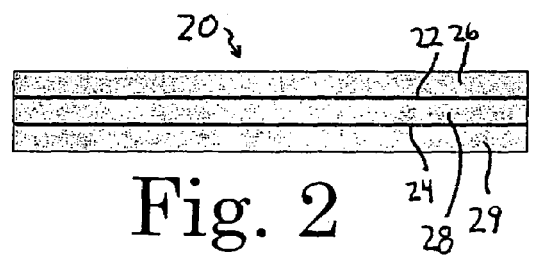
FIG. 2 is a cross-sectional view illustrating a damper precursor laminate according to another embodiment of the invention.

FIG. 2 is a cross-sectional view illustrating a damper precursor laminate according to another embodiment of the invention. The damper precursor laminate of the embodiment illustrated in FIG. 2 comprises a laminate body, generally designated by reference numeral 20. The laminate body 20 comprises a first viscoelastic sheet 22, a second viscoelastic sheet 24, a first curable sheet 26, a second curable sheet 28, and a third curable sheet 29. The first viscoelastic sheet 22 is interposed between the first and second curable sheets 26 and 28. Likewise, the second viscoelastic sheet 24 is interposed between the second and third curable sheets 28 and 29 to provide alternating viscoelastic and curable sheets. As illustrated, the edges of each sheet 22, 24, 26, 28, and 29 optionally may be exposed at the opposite ends of the precursor laminate 20.

According to another embodiment of the invention, a damper precursor laminate or laminate body, such as that of FIG. 1 or FIG. 2, is rolled into a "jelly-roll" configuration, in which the layers are situated in spiral profiles. The jelly-roll is preferably yet optionally embodied as one or more curable sheets overlaid with one or more viscoelastic sheets in a non-alternating manner. The sheets are then collectively rolled one or a plurality of revolutions to form the jelly-roll. Preferably, the curable sheet defines the outermost layer of the jelly-roll.

The damper precursor laminate of the present invention is not necessarily limited to the structures and sheet arrangements illustrated in FIGS. 1 and 2 and the above-described jelly-roll. For example, in FIGS. 1 and 2 and the above-described jelly-roll the curable/polymer matrix sheets alternate with the viscoelastic sheets. It is within the scope of the present invention to arrange a plurality of curable/polymer matrix sheets immediately adjacent one another (with no interposing viscoelastic sheet) or to arrange a plurality of viscoelastic sheets immediately adjacent one another (with no interposing curable/polymer matrix sheets). It is also within the scope of this invention for the damper precursor laminate to comprise a viscoelastic sheet or viscoelastic sheets as a surface layer of the laminate body, especially when the laminate body is introduced into the mold cavity as a jelly roll. Further, the laminate body may have a different number of total sheets than described above and illustrated in FIGS. 1 and 2. Moreover, the laminate body may include sheets of material other than the curable/polymer matrix and viscoelastic sheets, although the laminate body preferably consists essentially of, and more preferably consists of, the curable/polymer matrix and viscoelastic sheets.

According to another embodiment, the damper precursor laminate comprises a polymer matrix B-stage resin sheet having the viscoelastomer or fragments thereof incorporated into the resin sheet prior to molding, that is, during fabrication of the polymer matrix resin sheet.

FIGS. 1 and 2 depict curable sheets (14 and 16 in FIG. 1; 26, 28, and 29 in FIG. 2) having an identical thickness. However, the thickness of the curable sheets may differ from one another. Similarly, although FIG. 2 depicts the first and second viscoelastic sheets (22 and 24) having equal thickness, these sheets 22 and 24 may each have a thickness different from the other. Preferably, the curable/polymer matrix sheets are each thicker than the viscoelastic sheets. The thickness of each layer may be determined and adjusted based on the intended application of the damper structure, as well as other factors, including, for example, the materials selected for the curable and viscoelastic sheets. By way of example and not necessarily limitation, the viscoelastic sheets of an embodiment the invention has a thickness in a range of about 0.1 mil to about 10 mil (2.54 microns to 254 microns). According to another embodiment, the thickness range of the viscoelastic sheet is about 3 mil (76.2 microns) to about 5 mil (127 microns). The curable/polymer matrix sheets may each have a thickness, for example, in a range of about 10 mil (254 microns) to about 500 mil (1.27 cm), or about 50 mil (0.127 cm) to about 250 mil (0.635 cm), wherein a mil equals 0.001 inch. The thickness of the polymer matrix sheets may change during molding.

Each of the polymer matrix sheets may be comprised of a composition that is the same as or different from that of the other polymer sheet(s). However, for most applications it is preferred that each of the polymer matrix sheets comprises a substantially identical composition. Similarly, referring to the embodiment illustrated in FIG. 2, in the event the damper precursor laminate comprises two or more viscoelastic sheets, e.g., 22/24, the viscoelastic sheets may each be comprised of a substantially identical composition or may comprise different compositions from one another.

According to embodiments of the invention, the viscoelastic sheets may comprise, consist essentially of, or consist of one or more viscoelastomers. A viscoelastomer is stress-strain responsive. At a given temperature, the stress-strain response of a viscoelastomer is dependent upon the strain rate. At high strain rates, a viscoelastomer will exhibit more elastic behavior, while at low strain rates a viscoelastomer will exhibit more viscous behavior. A viscous behavior is generally defined as the ability of the material to significantly deform under load and to convert the energy stored by deformation into heat. An elastic behavior is the ability to exhibit a reversible deformation under load. The viscoelastic layer preferably comprises, and more preferably consists essentially of, at least one member selected from the group consisting of a (meth)acrylic acid based polymer and a (meth)acrylate-based polymer. As referred to herein as generally used in the art, the term (meth)acrylic means acrylic and/or methacrylic. Similarly, the term (meth)acrylate means acrylate and/or methacrylate. By way of example and not necessarily limitation, suitable (meth)acrylate-based polymers include acrylic acid ester homopolymers. The (meth)acrylate-based polymer may also comprise copolymers or terpolymers of a plurality of different (meth)acrylic acid esters or a combination of a (meth)acrylic acid ester and one or more copolymerizable monomer, oligomers, or prepolymers. In the case of copolymers and terpolymers, the (meth)acrylate-based polymer fraction may constitute a majority (more than 50 weight percent) of the total weight of polymer(s) in the viscoelastic material. According to another embodiment of the present invention, the viscoelastic layer may comprise a rubber, such as nitrile rubbers (e.g., acrylonitrile, acetonitrile), silicone rubber, fluoroelastomers, other elastomers, and combinations thereof. A currently preferred viscoelastic material is 5-mil tape of Avery Dennison™ UHA 1185, an acrylic adhesive available from AveryDennison.

The choice of viscoelastic material may optionally take into consideration the likely operating temperature to which the damper structure will be subject during use. The viscoelastic material preferably has a glass transition temperature ($T_g$) at or below the operating temperature of the device to be damped. The viscoelastic material preferably has high damping properties near the intended operating temperature. Selection of the viscoelastic material may take into account the loss factor of the constraining layer and the viscoelastomer, and the desired loss factor to be achieved. Loss factor is generally understood in the art as the ratio of dissipated energy (or energy loss) per radian divided by the peak potential or strain energy of a specimen. In an embodiment of the invention the loss factor (measured by ASTM E 756-98) of the viscoelastic material is greater than 0.5, and in another embodiment greater than 1.0, at the targeted temperatures. The viscoelastic layer may optionally contain fillers, such as carbon nanotubes, chopped fibers (e.g., glass, carbon, aramid), inorganic particles (e.g., silica), fly ash, etc. According to an embodiment of the invention, however, the viscoelastic layer optionally may be substantially free of fillers, especially inorganic fillers such as silica.

As discussed above, the curable compounds melt-flow about the viscoelastic damper layer and consolidate during molding to establish a constraining layer encasing the viscoelastic damper layer. The constraining layer may be a thermoplastic or thermoset. Representative polymers that may be used in accordance with embodiments of this invention include, for example, epoxy, urethane, ester, acetal, polystyrene, acrylonitrile-butadiene-styrene, polyvinylchloride, and combinations thereof. In one preferred embodiment the polymer matrix sheets comprise an unsaturated (or partially saturated) polyester sheet molding compound (SMC). SMC sheets are available from, for example, PreMix, Inc. and Ashland Chemical. The selected curable/polymer matrix compound preferably is substantially immiscible and preferably does not significantly chemically react with the viscoelastomer during molding so that, subsequent to molding, there is a discrete interface, preferably with substantially no interfacial bonding, between the continuous, polymeric constraining layer and the viscoelastic layer.

The constraining layer optionally also includes a filler, and more preferably a high-density filler. The term "high density" as used herein means a density greater than that of the sheet molding compound. A currently preferred filler comprises chopped fiberglass. Other fillers that may be used alone, in combination with one another, or in combination with fiberglass include, for example, carbon, aramids, metal, plastics, alumina, silica, silicon, ceramics, graphite, ferrite, ferrophosphorus, bauxite, combinations thereof, and the like. The fillers may be present as fibers, particles, powder, nanotubes (where appropriate), granules, and the like. The fillers are preferably yet optionally present in non-woven form, and are optionally dispersed substantially homogeneously throughout the constraining layer.

As discussed above, in embodiment of the invention the polymer matrix sheets and viscoelastic layer may be arranged as a "jelly roll" or sheet stack prior to introduction into the mold cavity. Generally, sheet stacks comprise a composite of alternating layers of polymer matrix and viscoelastic sheets laid flat. A jelly roll is similar to a sheet stack, but has been rolled along its length or width to provide a spiral profile of sheets. A jelly roll may consist of one polymer matrix sheet and one viscoelastic sheet, with the polymer matrix sheet preferably constituting the outer layer.

A method for making a damper structure from the precursor laminate according to embodiments of the present invention will be described below. It is to be understood that the damper structure of embodiments of this invention is not limited to the following method, and may be made by methods other than that described below. Likewise, the description below is not exhaustive and does not necessarily limit the scope of the inventive method.

Returning to FIG. 1, processing of the damper precursor laminate 10 may optionally comprise a consolidation step. For example, the damper precursor laminate 10 may be passed through a cold rolling assembly of the type disclosed in U.S. Pat. No. 6,202,462, which is incorporated herein by reference. Generally, the laminate 10 is in the form of an elongated, continuous web that is rolled on a supply coil, and is fed continuously through the cold rolling assembly. The assembly may include one or more roller sets sufficient in number to reduce the thickness of the web to a desired consolidated thickness, whether said thickness is selected as prescribed in the '462 patent or otherwise. Each of the roller sets includes a pair of rollers facing one another, between which the web is passed in a known manner, preferably continuously. The roller sets may be arranged successively closer together to effect a gradual reduction in thickness.

The damper precursor laminate 10, optionally after having undergone thickness reduction as described above, is then charged or otherwise introduced into a suitable molding apparatus. At the time of introduction, the laminate may be in the form of, for example, a flat multi-layer board or a jelly-roll. It is to be understood, however, that the charging step may alternatively comprise separately charging the viscoelastic sheet 12 and the polymer matrix sheets (or curable compounds) 14 and 16 into the molding apparatus as separate entities so that the laminate is first formed in the molding apparatus. The curable compounds may be in B-stage cure state, or the curable compounds may be cured to a greater or lesser degree prior to introduction into the mold. Examples of a molding apparatus that may be used for this embodiment of the method of the present invention include those suitable for carrying out, for example, compression molding and/or transfer molding. It is to be understood that other molding techniques may be used within the scope of aspects of this invention. It is also to be understood that a standard, commercially available molding apparatus may be used.

In a preferred embodiment of the present invention, the polymer matrix sheets 14 and 16 charged into the molding apparatus are in a partially cured state, that is, the sheets are B-stage resins when introduced into the molding apparatus. An exemplary partially cured resin is an unsaturated polyester, or SMC compound. The polymer matrix sheets may optionally include curing agents/initiators to facilitate cure. Commercially available SMC sheets often include curing agents, such as peroxides and the like. On the other hand, the viscoelastic sheet 12 is preferably yet optionally fully or substantially fully cured when introduced into the molding apparatus. The molding apparatus is then closed or partially closed, depending upon the designed operation of the apparatus.

While in the molding apparatus, the laminate 10 is subject to heat and preferably pressure. The selected temperature and pressure may vary, for example, depending upon the curable compounds selected and complexity of the mold shape. Generally, the temperature is greater than the melt temperature of the SMC sheet resin and preferably is high enough to induce melt-flow and cure of the curable compounds. An example of a suitable temperature range used with unsatured polyester SMC resins is about 175° C. to about 250° C. An example of a suitable pressure range used with the same resins is about 500 psi to about 5000 psi. Temperatures and pressures suitable for curable compounds other than SMCs may be based on the compound cure properties, which are known and reported in the literature. Temperature and pressure may be maintained substantially constant or may be varied during molding.

Figure 3:
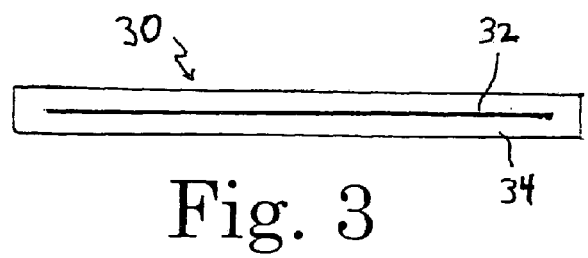
FIG. 3 is a cross-sectional view of a damper structure according to an embodiment of the present invention.

Preferably, the molding conditions are effective to cause the first and second polymer matrix sheets 14 and 16 to melt, or partially melt and consolidate with one another to form a continuous constraining layer 34, as shown in FIG. 3. The mold conditions and mold cavity size preferably are adequate to cause the first and second polymer matrix sheets 14 and 16 to flow around the edges and ends of the viscoelastic sheet 12 so that, upon cooling, the resulting continuous constraining layer 34 intimately contacts and encases the viscoelastic layer 32. In the event that a B-stage resin is selected for the curable compound, molding conditions are preferably sufficient to induce continued cure of the sheets 14 and 16. In their fully cured state, that is, when removed from the mold, the constraining layer 34 may be a thermoplastic or a thermoset, although the constraining layer is preferably a thermoset. Although the damper structure 30 is illustrated as having a substantially rectangular cross-section, it is to be understood that the outer surfaces of the constraining layer 34 may undertake a shaped profile, as dictated by the mold die surfaces.

In an optional embodiment, the molding process is performed under conditions effective to generate a sufficiently robust internal material flow and mixing action within the mold for shearing the viscoelastic sheet 12 into a fragmented damper layer comprising a plurality of fragments that are noncontinuous with each other. Generally, jelly rolls are more susceptible to fragmentation than stacked sheets. Without wishing to be bound by any theory, it is believed that during molding jelly rolls undergo more deformation along their z-axis (i.e., perpendicular to their surface planes) and are more greatly influenced by shearing forces than an unrolled stack of sheets.

Figure 4:
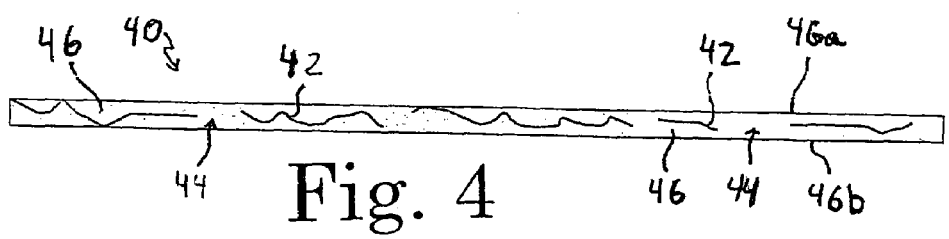
FIG. 4 is a cross-section of a damper structure according to another embodiment of the present invention.

The embodiment illustrated in FIG. 4 depicts a two-layer jelly-roll after it has been molded into a damper structure material 40 in accordance with an embodiment of the method of the invention. As shown in FIG. 4, the viscoelastic sheet has been sheared in a fragmented damper layer comprising a plurality of fragments 42 that are noncontinuous with one another to provide interstices, generally designated by reference numeral 44, between the noncontinuous fragments 42. The polymeric matrix sheet or sheets are consolidated into a continuous constraining layer 46 intimately contacting and encasing the fragmented damper layer fragments 42 and filling the interstices 44 between the noncontinuous fragments 42. As further shown in FIG. 4, the fragments 42 of the fragmented damper layer may possess a non-linear profile and may lie in different planes from one another. Generally, most and more preferably all of the fragments 42 are located between opposite surfaces 46a and 46b of the continuous constraining layer 46 and are hidden from view.

The constraining layer 48 (or 34) has a greater stiffness and modulus than the fragmented damper layer 44 (or continuous damper layer 32), thereby providing structural support to the damper structure 40 (or 30). For example, the viscoelastomer damper layer 44 (or 32) may have a shear modulus on the order of about 1 psi to about 1000 psi, such as about 100 psi. The constraining layer 48 (or 34) may optionally have a shear modulus above about 500,000 psi, optionally in a range of 500,000 psi to about 3,000,000 psi (or 1,000,000 psi to 3,000,000 psi). Preferably, the shear modulus (as measured by ASTM E143-02) of the constraining layer is at least 1, more preferably at least 2 or at least 3 orders of magnitude greater than the shear modulus of the damper layer. The constraining layer preferably yet optionally has a density greater than about 3.0, more preferably about 5.0 grams/cm$^3$ (g/cc).

Figure 19:
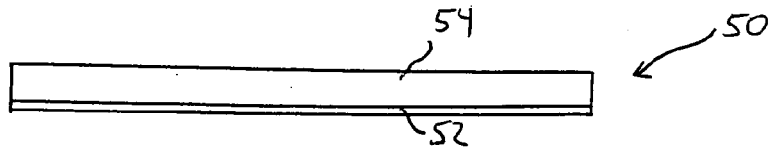
FIG. 19 is an elevational view of a damper structure according to still another embodiment of the invention.

Another embodiment of a damper structure 50 illustrated in FIG. 19 comprises a continuous, polymeric constraining layer 54 having first and second surfaces opposite to one another, and a viscoelastic damper layer 52 intimately contacting at least one of the first and second surfaces of the constraining layer 54. The constraining layer 54 is molded from a high density filler and a melt-flowable polymer matrix that is immiscible with the viscoelastic damper layer 52 to provide a discrete interface between the constraining layer 54 and the viscoelastic damper layer 52. The constraining layer 54 has a greater stiffness than the viscoelastic damper layer 52, a modulus of dynamic shearing elasticity that is at least 500,000 psi and higher than the viscoelastic damper layer 52, and a density of at least 3.0 grams per cubic centimeter, more preferably at least 5.0 grams per cubic centimeter.

Figure 21:
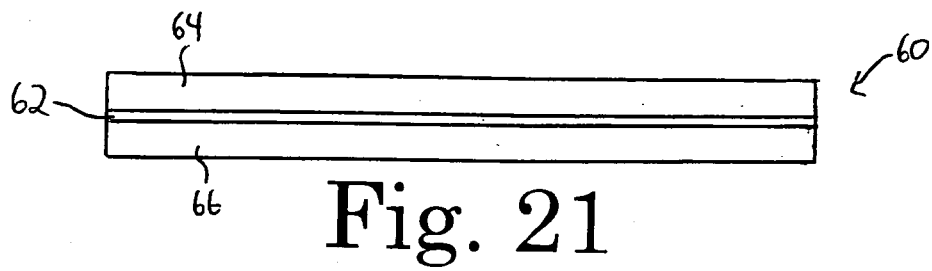
FIG. 21 is an elevational view of a damper structure according to a further embodiment of the invention.

Still another embodiment of a damper structure 60 illustrated in FIG. 21 comprises first and second continuous, polymeric constraining layers 64 and 66 each having an inner surface and an outer surface, and a viscoelastic damper layer 62 intimately contacting the inner surfaces of the constraining layers 64 and 66. The constraining layers 64 and 66 are molded from a high density filler and a melt-flowable polymer matrix that is immiscible with the viscoelastic damper layer 62 to provide a discrete interface between the constraining layers 64 and 66 and the viscoelastic damper layer 62. The constraining layers 64 and 55 have a greater stiffness than the viscoelastic damper layer 62, a modulus of dynamic shearing elasticity that is at least 500,000 psi and higher than the viscoelastic damper layer 62, and a density of at least 3.0, more preferably at least 5.0 grams per cubic centimeter.

The viscoelastic damper layers 52, 64 and constraining layers 54, 64, 66 of the embodiments illustrated in FIGS. 19 and 21 may comprise any of the materials, dimensions, configurations, and properties specified above with regard to damper structures 30 and 40. The damper structures 50 and 60 may be prepared in a mold cavity in a manner specified above. For example, a surface of the viscoelastic damper layer 52 may be secured in intimate contact with a mold cavity surface to leave said surface exposed, i.e., not covered with the constraining layer 54, when removed from the mold cavity. Alternatively, the constraining layers 54, 64, 66 may be molded without the viscoelastic layers 52, 62 in the mold cavity, in which case the viscoelastic layer may be applied to the molded and shaped constraining layer 54 or layers 64, 66 subsequent to molding.

In preferred embodiments of the present invention, the damper layer is principally responsible for absorbing and dissipating vibration and/or noise resonating from a device. However, the constraining layer may also contribute to the vibration and noise-damping properties of the damper structure. The damper structure may comprise additional layers, both damping and non-damping. For example, a portion or all of the outer surface of the damper structure may include a coating. The coating material may be selected for various purposes, including aesthetics and protection from outside forces. The coating may be applied, for example, by painting or plating (e.g., electro or electroless plating).

Figure 17:
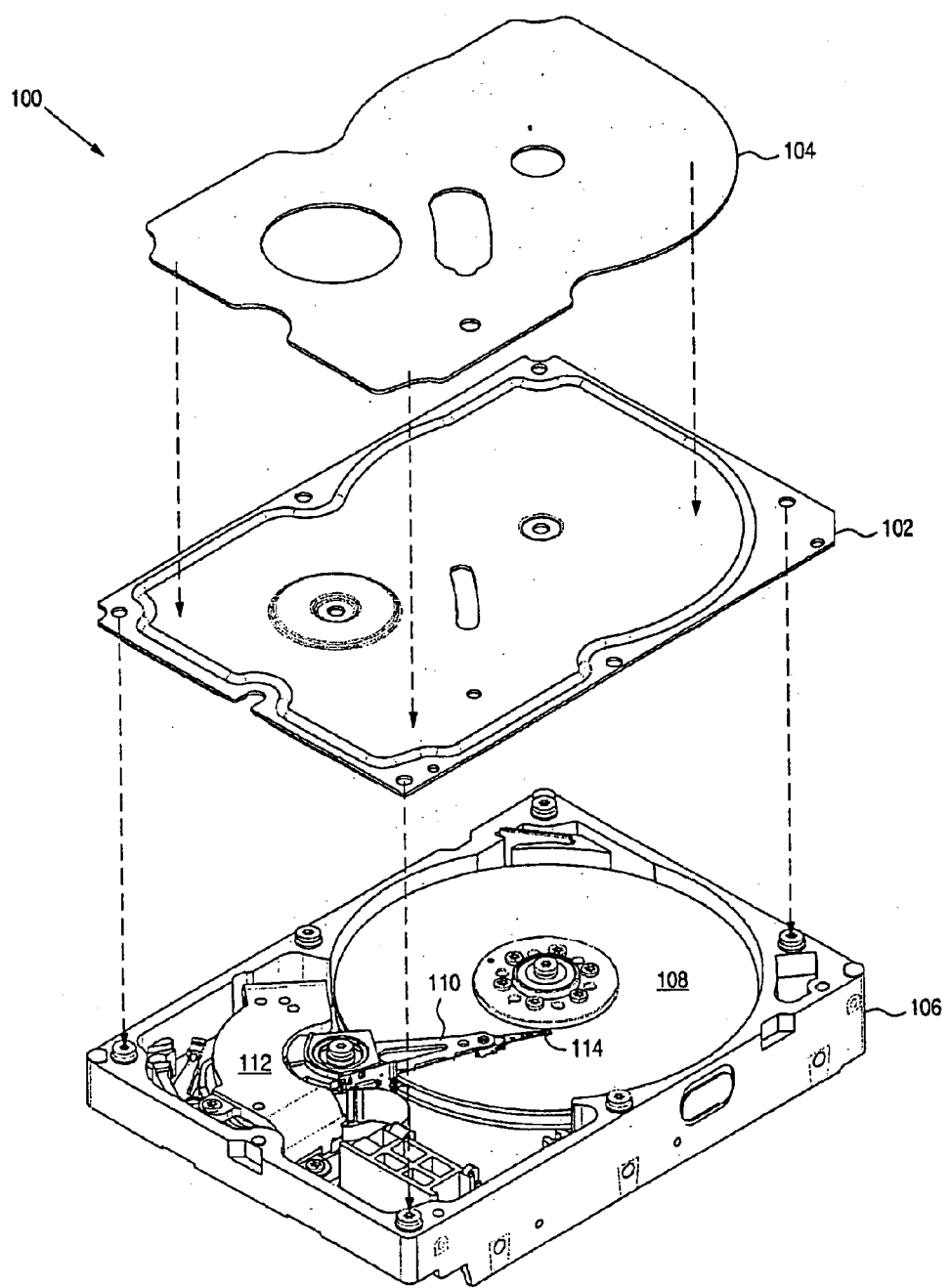
FIG. 17 is an exploded assembly view of a conventional disc drive assembly.
Figure 18:
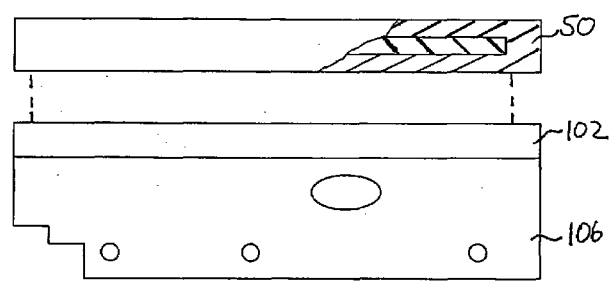
FIG. 18 is an exploded side, elevational view, with portions shown in section, of a computer disc drive housing including a damper structure according to an embodiment of the present invention, in which the damper structure is shown partially sectioned.
Figure 20:
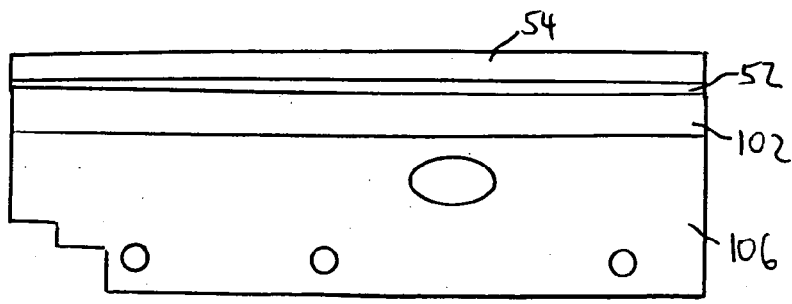
FIG. 20 is a side elevational view of a computer disc drive housing including a damper structure according to the embodiment of FIG. 19.
Figure 22:
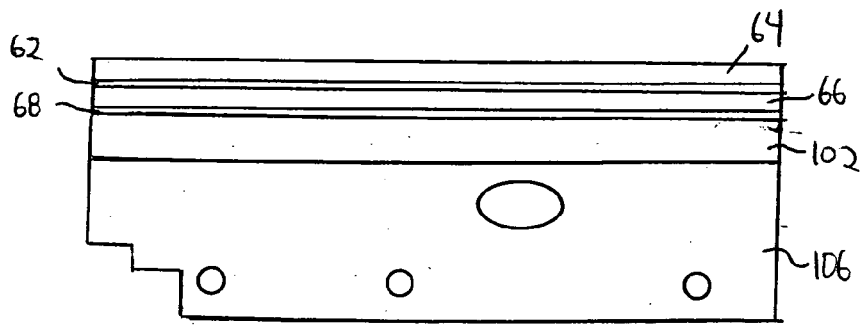
FIG. 22 is an elevational view of a computer disc drive housing including a damper structure according to the embodiment of FIG. 21.

The damper structure of the present invention is preferably placed into close proximity to, such as attached to, a computer disk drive. Examples of a damper structure mounted on a disc drive unit in accordance with an embodiment of this invention are illustrated in FIGS. 18, 20, and 22. The disc drive units of FIGS. 18, 20, and 22 each have inner operative components substantially identical to that of FIG. 17, except that the disc drive unit further comprises damper structures 30, 50, and 60, respectively, mounted on the top cover 102 of the disc drive unit. As shown in FIG. 22, the damper structures (e.g., 60) may be mounted to the top cover 102 with a second viscoelastic layer 68. Although not shown, a damper structure may be placed on the base of the disc drive housing, that is, in addition to or as an alternative of the damper structure on the cover. The damper structure of the present invention may be mounted in operative association with (e.g., on, inside, or in sufficiently close proximity to) the disc drive housing to effectively damp vibration and acoustic noises generated by, for example, movement of the actuator arms relative to the disc surfaces and the driving movement of the motor.

In another preferred embodiment of the present invention, a retrofitting method is provided, which comprises placing the damper structure in proximity to an existing structural component of the device. The high shapeability of the constraining layer makes it possible to mold the damper structure into various complex shapes, including a shape (and dimensions) matching or complementary to those of an existing structural component of a device.

EXAMPLES

The following examples serve to explain and elucidate the principles and practice of the present invention further. These examples are merely illustrative, and not exhaustive as to the scope of the present invention.

All percentages are weight percentages, unless specifically stated otherwise. The curable/polymer matrix sheets for the examples and comparative examples were each sheet molding compounds (SMCs) obtained from Ashland Specialty Chemicals of Dublin, Ohio. The viscoelastic layer of the examples was Avery 1185 obtained from Avery Dennison. The precursor laminates were molded at a tool temperature of 300° F. (149° C.) at 100 psi to 400 psi for 3 minutes. The molded composites were cut into 0.5 inch×10 inch beams, and were tested with a mini hammer system. All modal tests were run from room temperature (70° F./21° C.) to 225° F. (107° C.) to represent a wide range of disc drive operating temperatures.

The laminates were compared to a baseline SMC compound laminate (comparative examples) with no damping layer.

Example 1 and Comparative Example A

A damper precursor laminate was prepared containing three stacked layers of Arotech® 2002 SMC containing 60 weight percent glass and one viscoelastic layer inserted between the bottom two SMC layers. The laminate had charge dimensions of 8 inches×8 inches and a weight of 513 grams.

The laminate of Example 1 was compared to a baseline/control laminate of Comparative Example A, which consisted of a SMC compound made from a damper precursor laminate containing three-stacked layers of SMC as described above in Example 1, but with no viscoelastic damping layer. The laminate of Comparative Example A had charge dimensions of 8 inches×8 inches and a weight of 511 grams.

Figure 5:
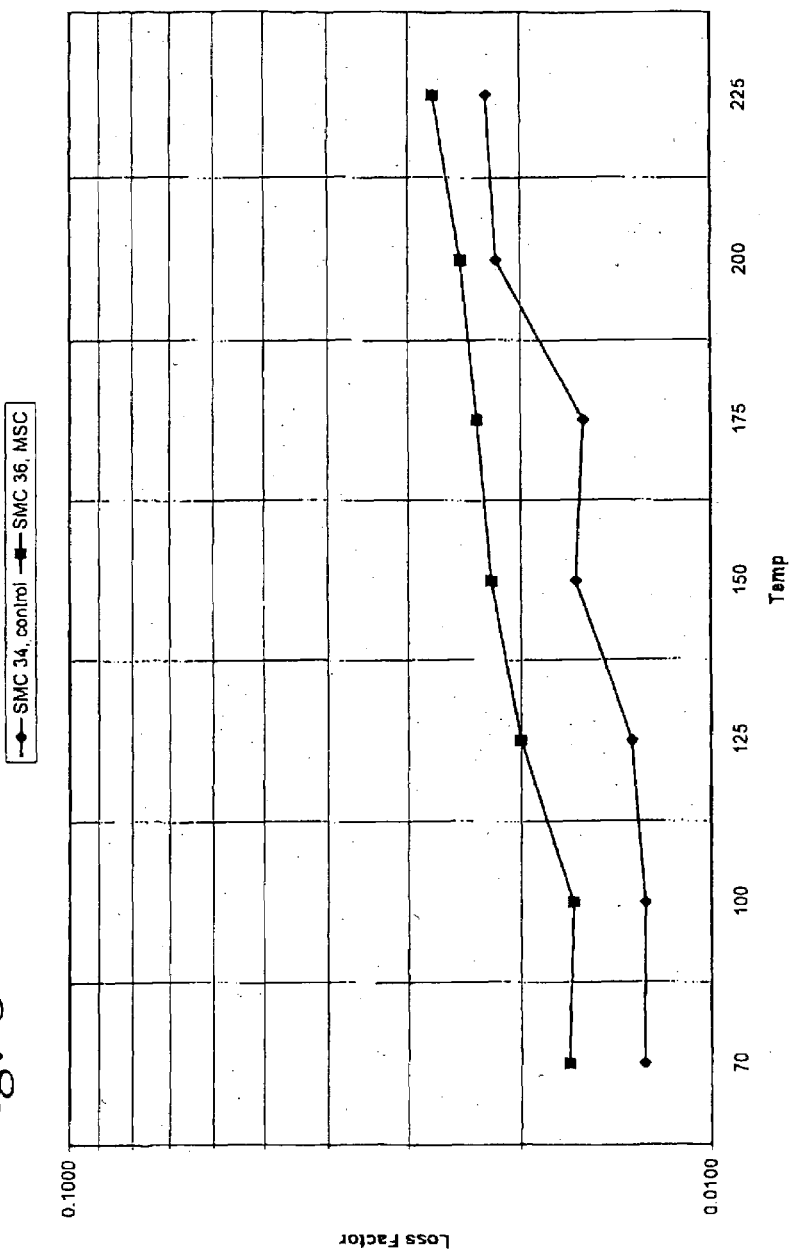
FIG. 5 and FIG. 6 each are graphs comparing the loss factors for Example 1 and Comparative Example A over a temperature range.
Figure 6:
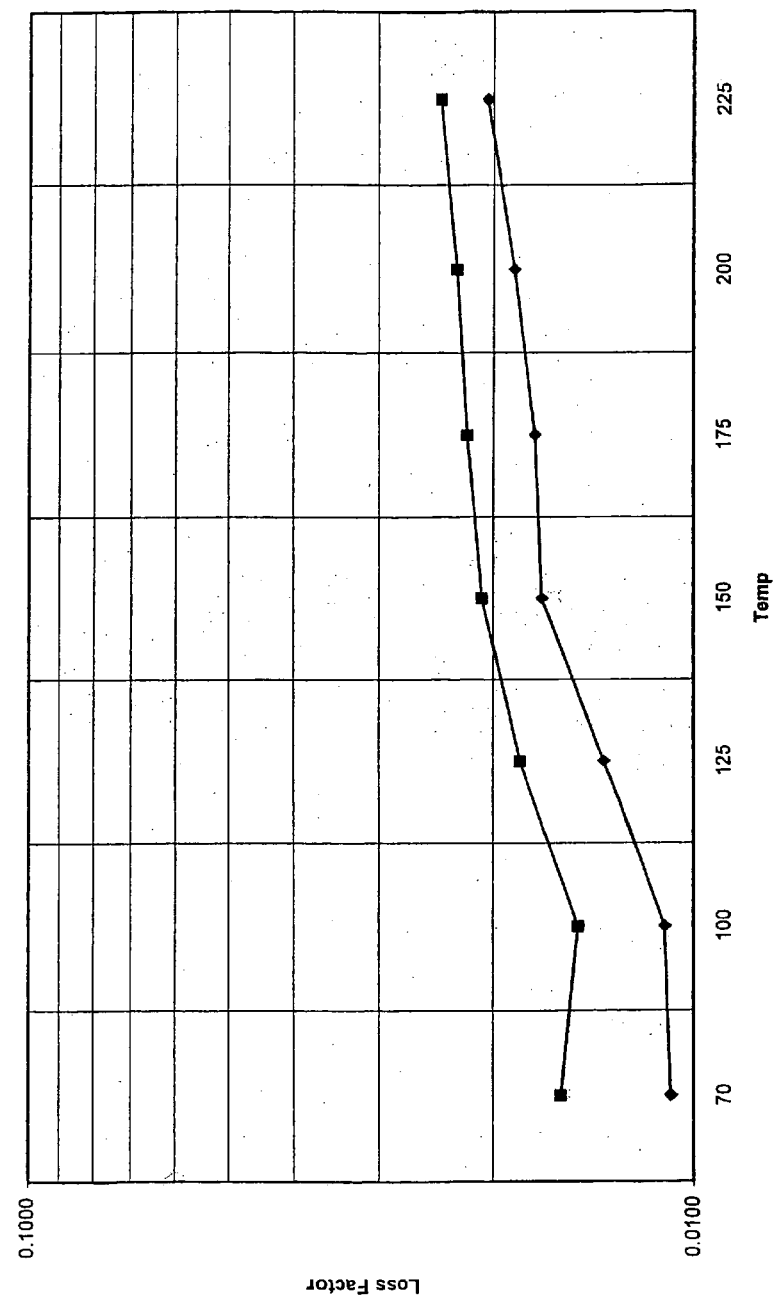

After molding, the laminates of Example 1 (designated SMC 36) and Comparative Example A (designated SMC 34, control) were subjected to two rounds of testing, and exhibited the following loss factors, which are illustrated in graphical form in FIGS. 5 and 6, respectively.

TABLE 1

(Loss Factor) for Example 1 and Comparative Example A

| Temperature (° F.) | Testing Round 1 | | Testing Round 2 | |
|---|---|---|---|---|
| | Example 1 | Comparative Example A | Example 1 | Comparative Example A |
| 70 | 0.017 | 0.0128 | 0.016 | 0.0108 |
| 100 | 0.017 | 0.0128 | 0.015 | 0.0110 |
| 125 | 0.020 | 0.0134 | 0.018 | 0.0136 |
| 150 | 0.022 | 0.0164 | 0.021 | 0.0168 |
| 175 | 0.023 | 0.0160 | 0.022 | 0.0172 |
| 200 | 0.025 | 0.0218 | 0.023 | 0.0186 |
| 225 | 0.027 | 0.0226 | 0.024 | 0.0204 |

The laminate of Example 1 exhibited average loss factors of 0.022 and 0.020 in rounds 1 and 2, respectively, compared to average loss factors of 0.0165 and 0.0155 for Comparative Example A. Hence, Example 1 exhibited loss factor improvements of 33% and 29% over Comparative Example A for rounds 1 and 2, respectively.

Example 2 and Comparative Example B

A damper precursor laminate was prepared containing a jelly roll of one layer of Arotech® 2002 SMC containing 60 weight percent glass and one viscoelastic layer adjacent the SMC layer. The laminate was rolled into a jelly roll (with an SMC outer layer) and had a charge weight of 513 grams.

The laminate of Example 2 was compared to a baseline/control laminate of Comparative Example B, which consisted of a SMC compound made from a damper precursor laminate jelly roll containing a layer of SMC as described above in Example 2, but with no damping layer. The laminate of Comparative Example B had a charge weight of 510 grams.

Figure 7:
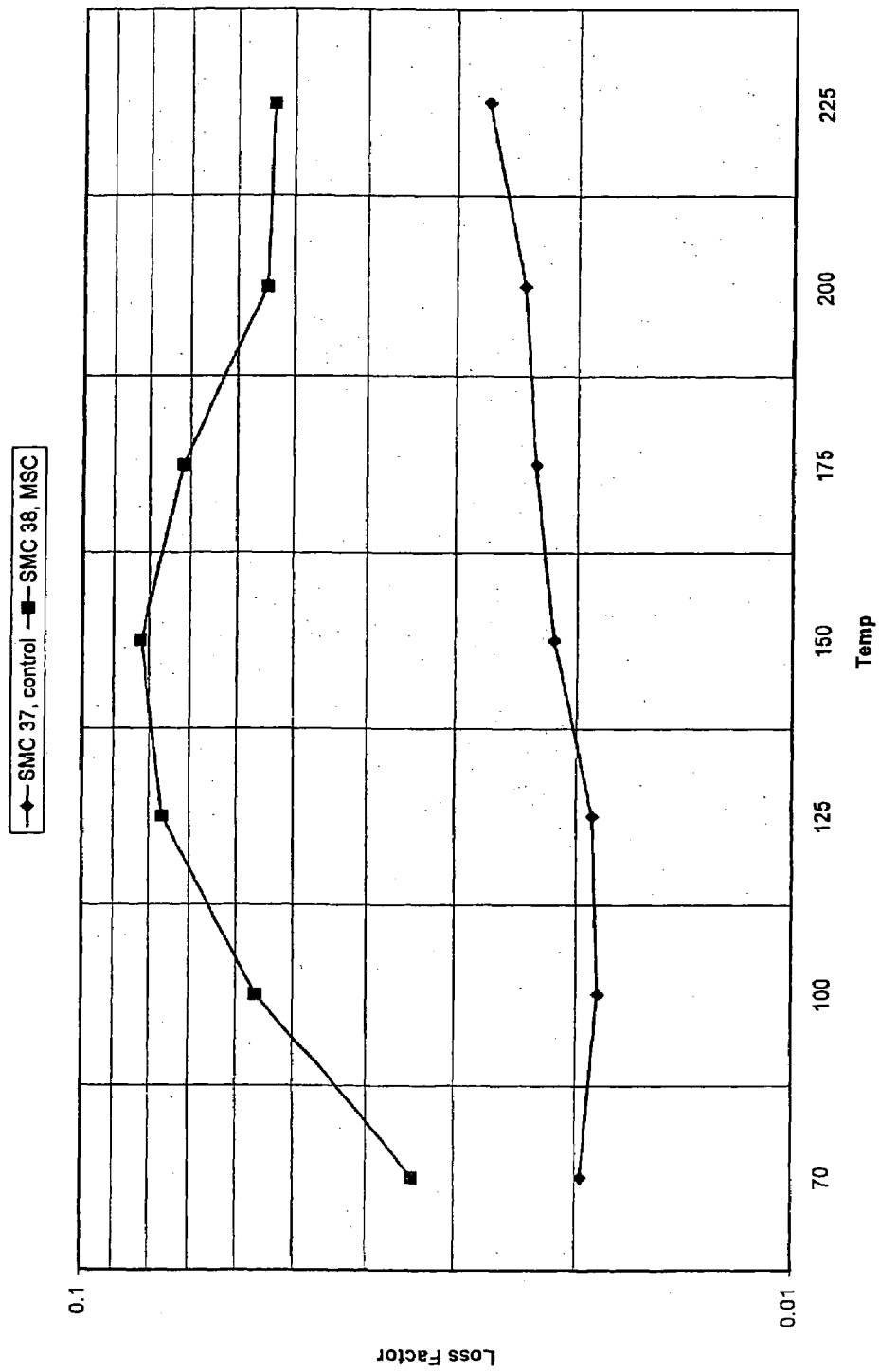
FIG. 7 and FIG. 8 each are graphs comparing the loss factors for Example 2 and Comparative Example B over a temperature range.
Figure 8:
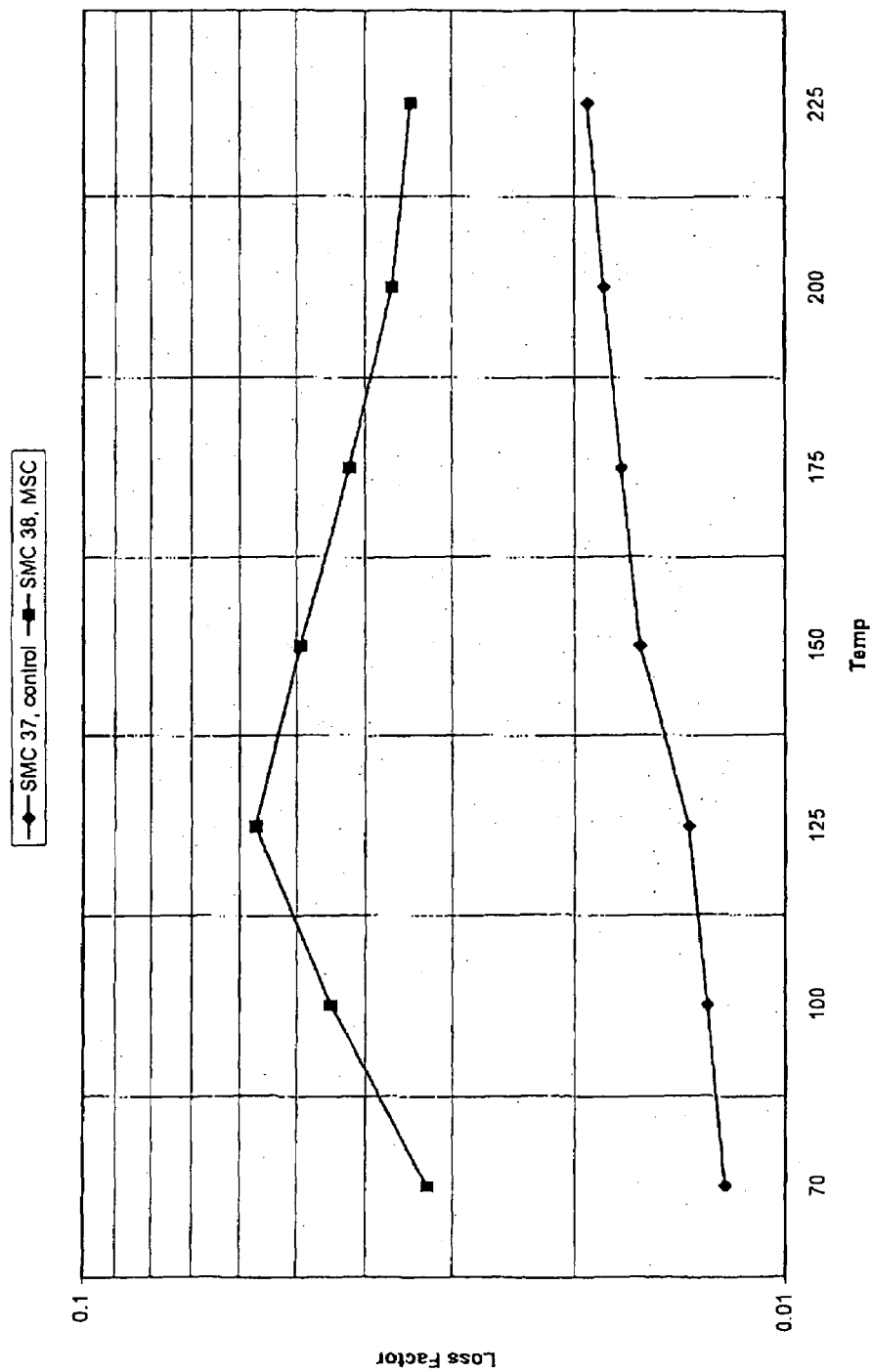

After molding, the laminates of Example 2 (designated SMC 38, MSC) and Comparative Example B (designated SMC 37, control) were subjected to two rounds of testing, and exhibited the following loss factors, which are illustrated in graphical form in FIGS. 7 and 8, respectively.

TABLE 2

(Loss Factor) for Example 2 and Comparative Example B

| Temperature (° F.) | Testing Round 1 | | Testing Round 2 | |
|---|---|---|---|---|
| | Example 2 | Comparative Example B | Example 2 | Comparative Example B |
| 70 | 0.0344 | 0.0196 | 0.0326 | 0.0122 |
| 100 | 0.0564 | 0.0186 | 0.0448 | 0.0129 |
| 125 | 0.0766 | 0.0189 | 0.057 | 0.0137 |
| 150 | 0.0824 | 0.0216 | 0.0494 | 0.0161 |
| 175 | 0.0716 | 0.023 | 0.0422 | 0.0172 |
| 200 | 0.0546 | 0.024 | 0.0366 | 0.0182 |
| 225 | 0.0534 | 0.027 | 0.0344 | 0.0192 |

Referring to Table 2, the laminate of Example 2 exhibited average loss factors of 0.0612 and 0.0424 in rounds 1 and 2, respectively, compared to average loss factors of 0.0218 and 0.0156 for Comparative Example B. Hence, Example 2 exhibited improvements of 181% and 172% in loss factor over Comparative Example B for rounds 1 and 2, respectively.

Example 3 and Comparative Example C

A damper precursor laminate was prepared containing six stacked layers of Arotech® 2002 SMC containing 60 weight percent glass and one viscoelastic layer inserted between the third and fourth SMC layers. The laminate had charge dimensions of 8 inches×8 inches and a weight of 1100 grams.

The laminate of Example 3 was compared to a baseline/control laminate of Comparative Example C, which consisted of a SMC compound made from a damper precursor laminate containing six-stacked layers of SMC as described above in Example 3, but with no damping layer. The laminate of Comparative Example C had charge dimensions of 8 inches×8 inches and a weight of 1100 grams.

Figure 9:
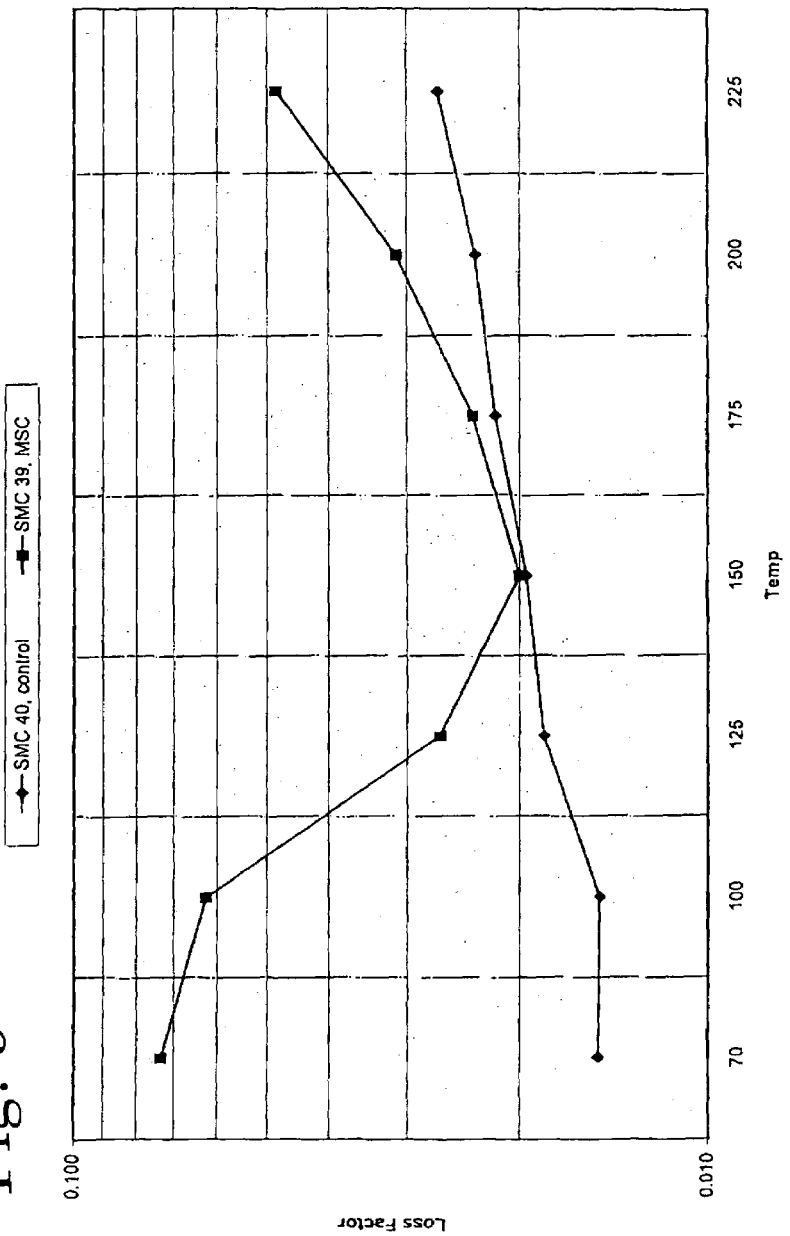
FIG. 9 and FIG. 10 each are graphs comparing the loss factors for Example 3 and Comparative Example C over a temperature range.
Figure 10:
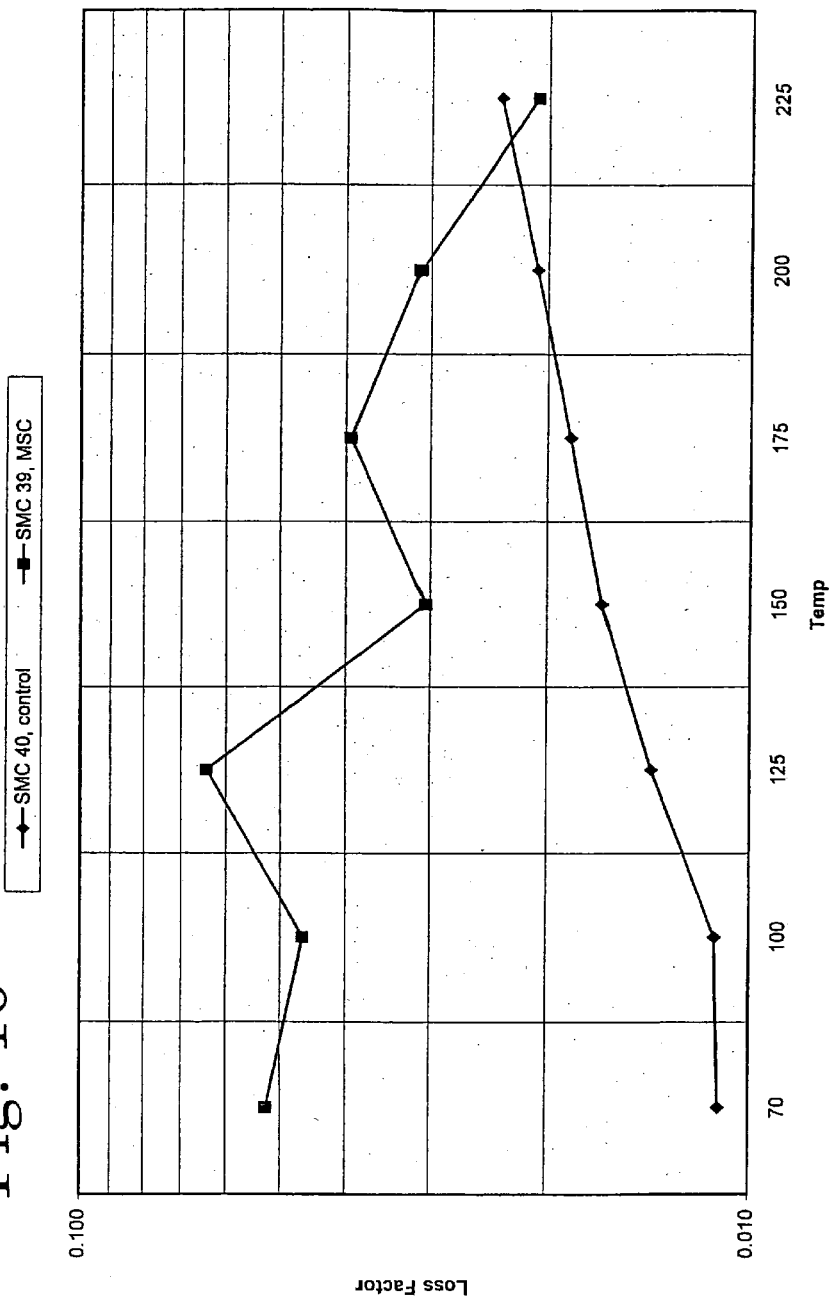

After molding, the laminates of Example 3 (designated SMC 39, MSC) and Comparative Example C (designated SMC 40, control) were subjected to two rounds of testing, and exhibited the following loss factors, which are illustrated in graphical form in FIGS. 9 and 10, respectively.

TABLE 3

(Loss Factor) for Example 3 and Comparative Example C

| Temperature (° F.) | Testing Round 1 | | Testing Round 2 | |
|---|---|---|---|---|
| | Example 3 | Comparative Example C | Example 3 | Comparative Example C |
| 70 | 0.073 | 0.015 | 0.052 | 0.011 |
| 100 | 0.062 | 0.015 | 0.046 | 0.011 |
| 125 | 0.027 | 0.018 | 0.064 | 0.014 |
| 150 | 0.020 | 0.020 | 0.030 | 0.017 |
| 175 | 0.024 | 0.022 | 0.039 | 0.018 |
| 200 | 0.031 | 0.023 | 0.031 | 0.021 |
| 225 | 0.048 | 0.027 | 0.021 | 0.024 |

Referring to Table 3, the laminate of Example 3 exhibited average loss factors of 0.041 and 0.040 in rounds 1 and 2, respectively, compared to average loss factors of 0.020 and 0.017 for Comparative Example C. Hence, Example 3 exhibited 105% and 135% loss factor improvements over Comparative Example C for rounds 1 and 2, respectively.

Example 4 and Comparative Example D

A damper precursor laminate was prepared containing two stacked layers of Arotech® 2002 SMC containing 60 weight percent glass and one viscoelastic layer inserted between the two SMC layers. The laminate had charge dimensions of 10 inches×10 inches.

The laminate of Example 4 was compared to a baseline/control laminate of Comparative Example D, which consisted of a SMC compound made from a damper precursor laminate containing two-stacked layers of SMC as described above in Example 4, but with no damping layer. The laminate of Comparative Example D had charge dimensions of 10 inches×10 inches.

Figure 11:
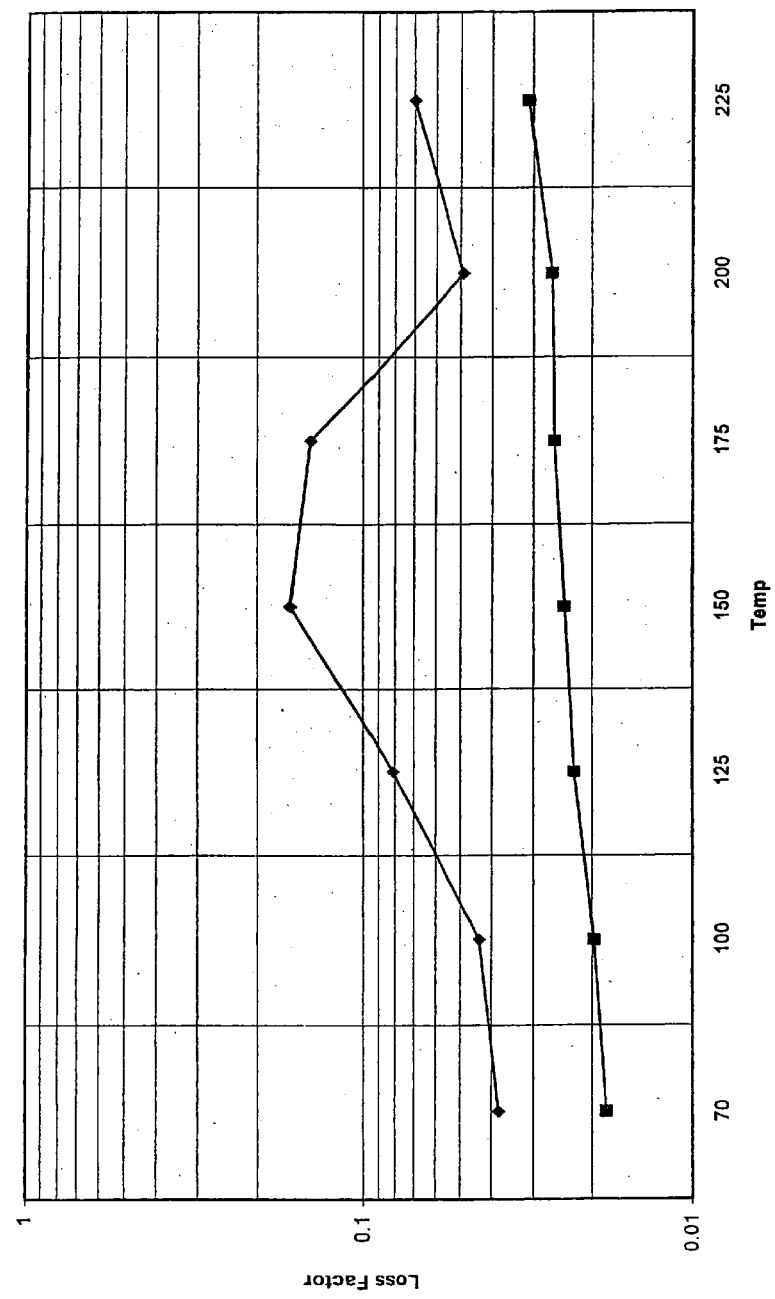
FIG. 11 and FIG. 12 each are graphs comparing the loss factors for Example 4 and Comparative Example D over a temperature range.
Figure 12:
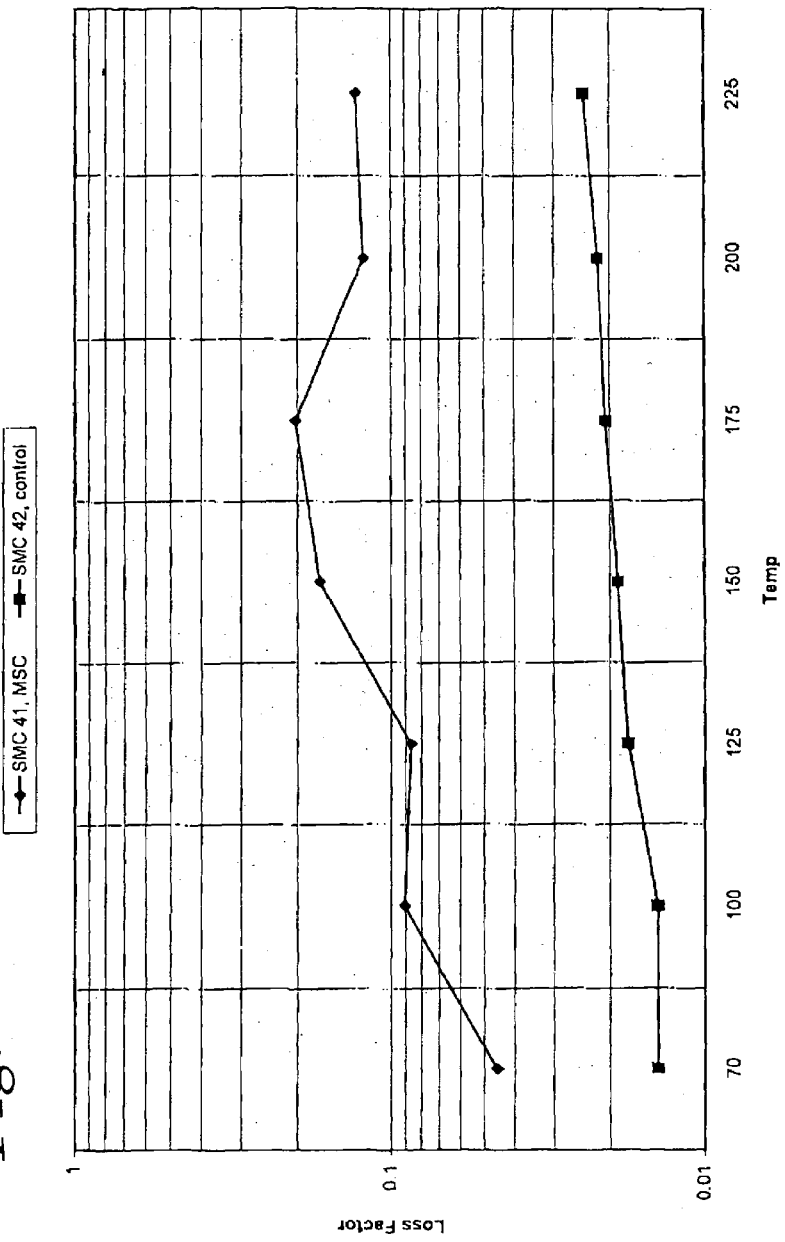

After molding, the laminates of Example 4 (designated SMC 41, MSC) and Comparative Example D (designated SMC 42, control) were subjected to two rounds of testing, and exhibited the following loss factors, which are illustrated in graphical form in FIGS. 11 and 12, respectively.

TABLE 4

(Loss Factor) for Example 4 and Comparative Example D

| Temperature (° F.) | Testing Round 1 | | Testing Round 2 | |
|---|---|---|---|---|
| | Example 4 | Comparative Example D | Example 4 | Comparative Example D |
| 70 | 0.038 | 0.0182 | 0.0456 | 0.0141 |
| 100 | 0.0438 | 0.0197 | 0.0906 | 0.0141 |
| 125 | 0.0812 | 0.0226 | 0.0864 | 0.0176 |
| 150 | 0.162 | 0.0242 | 0.1698 | 0.0188 |
| 175 | 0.141 | 0.0260 | 0.203 | 0.0206 |
| 200 | 0.0492 | 0.0264 | 0.1228 | 0.0218 |
| 225 | 0.07 | 0.0310 | 0.13 | 0.0242 |

Referring to Table 4, the laminate of Example 4 exhibited average loss factors of 0.084 and 0.12 in rounds 1 and 2, respectively, compared to average loss factors of 0.0240 and 0.0187 for Comparative Example D. Hence, Example 4 exhibited 250% and 542% loss factor improvements over Comparative Example D for rounds 1 and 2, respectively.

Examples 5 and 6 and Comparative Example E

A damper precursor laminate designated Example 5 was prepared containing six stacked layers of Arotech® 2002 SMC containing 60 weight percent glass and one viscoelastic layer inserted between the third and fourth SMC layers. Another damper precursor laminate designated Example 6 was prepared containing six stacked layers of Arotech® 2002 SMC containing 60 weight percent glass, and three viscoelastic layers inserted between the third and the fourth SMC layers. Both laminates had charge dimensions of 3 inches×10 inches.

The laminates of Examples 5 and 6 were compared to a baseline/control laminate of Comparative Example E, which consisted of a SMC compound made from a damper precursor laminate containing six-stacked layers of SMC as described above in Examples 5 and 6, but with no damping layer(s). The laminate of Comparative Example E had charge dimensions of 3 inches×10 inches.

Figure 13:
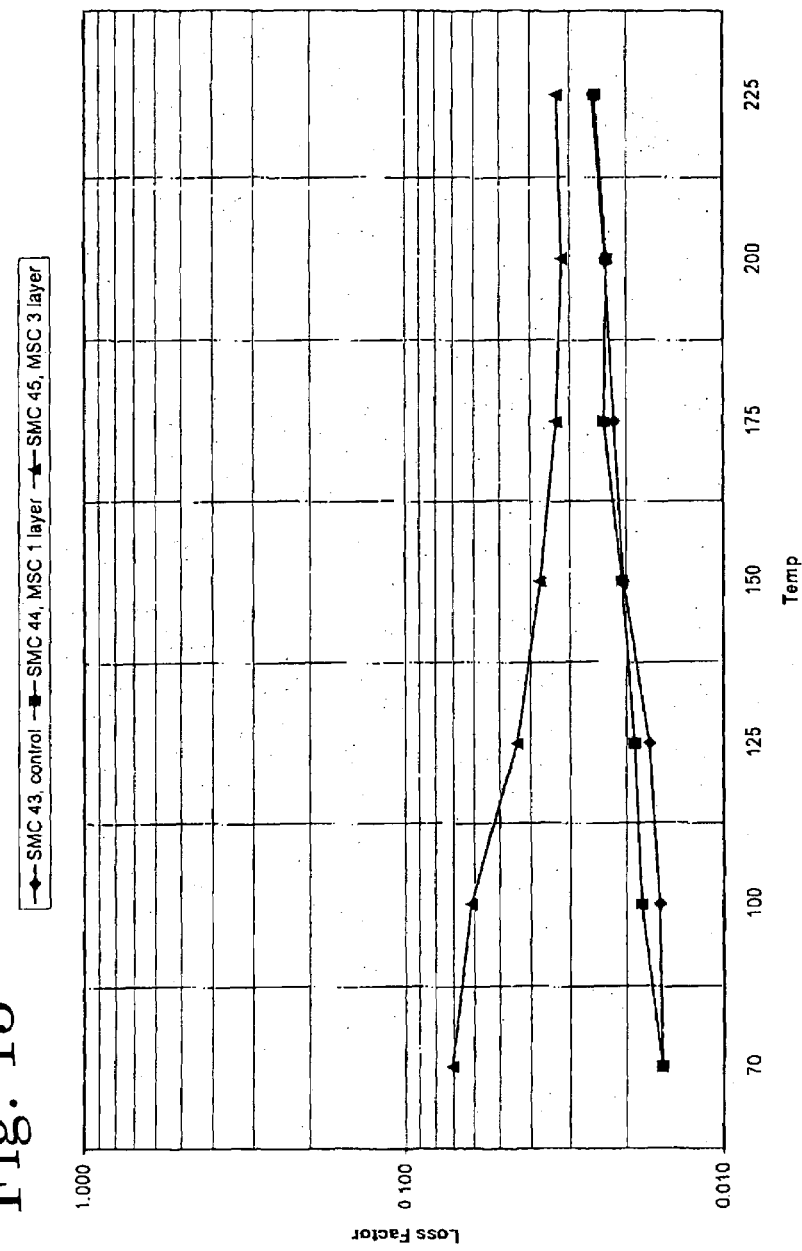
FIG. 13 and FIG. 14 each are graphs comparing the loss factors for Examples 5 and 6 and Comparative Example E over a temperature range.
Figure 14:
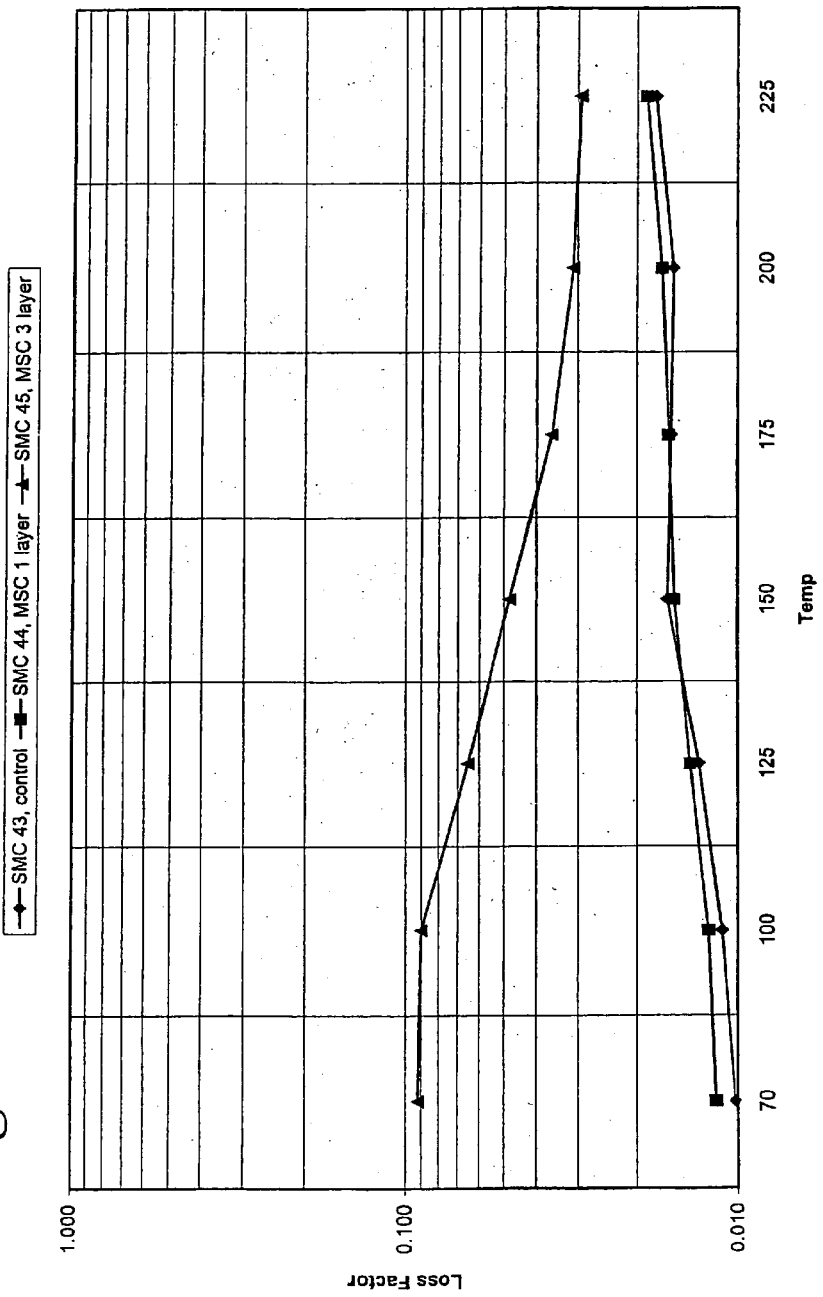

After molding, the laminates of Examples 5 and 6 (designated SMC 44 and SMC 45, respectively) and Comparative Example E (designated SMC 43, control) were subjected to two rounds of testing, and exhibited the following loss factors, which are illustrated in graphical form in FIGS. 13 and 14, respectively.

TABLE 5

(Loss Factor) for Examples 5 & 6 and Comparative Example E

| Temp. (° F.) | Testing Round 1 | | | Testing Round 2 | | |
|---|---|---|---|---|---|---|
| | Ex. 5 | Ex. 6 | Comp. Ex. E | Ex. 5 | Ex. 6 | Comp. Ex. E |
| 70 | 0.015 | 0.071 | 0.016 | 0.012 | 0.092 | 0.010 |
| 100 | 0.018 | 0.061 | 0.016 | 0.012 | 0.090 | 0.011 |
| 125 | 0.019 | 0.044 | 0.017 | 0.014 | 0.065 | 0.013 |
| 150 | 0.021 | 0.037 | 0.020 | 0.016 | 0.048 | 0.016 |
| 175 | 0.023 | 0.033 | 0.022 | 0.016 | 0.036 | 0.016 |
| 220 | 0.023 | 0.032 | 0.023 | 0.017 | 0.031 | 0.016 |
| 225 | 0.025 | 0.033 | 0.025 | 0.019 | 0.029 | 0.018 |

Referring to Table 5, the laminate of Example 6 exhibited average loss factors of 0.044 and 0.056 in rounds 1 and 2, respectively, compared to average loss factors of 0.020 and 0.014 for Comparative Example E. Hence, Example 6 exhibited 120% and 300% loss factor improvements over Comparative Example E for rounds 1 and 2, respectively.

Examples 7 and 8 and Comparative Example F

A damper precursor laminate designated Example 7 was prepared containing six stacked layers of SLI-272 SMC containing 27 weight percent glass and one viscoelastic layer inserted between the third and fourth SMC layers. Another damper precursor laminate designated Example 8 was prepared containing six stacked layers of SLI-272 SMC containing 27 weight percent glass, and three viscoelastic layers inserted between the third and the fourth SMC layers. Both laminates had charge dimensions of 3 inches×10 inches.

The laminates of Examples 7 and 8 were compared to a baseline/control laminate of Comparative Example F, which consisted of a SMC compound made from a damper precursor laminate containing six-stacked layers of SMC as described above in Examples 7 and 8, but with no damping layer(s). The laminate of Comparative Example F had charge dimensions of 3 inches×10 inches.

Figure 15:
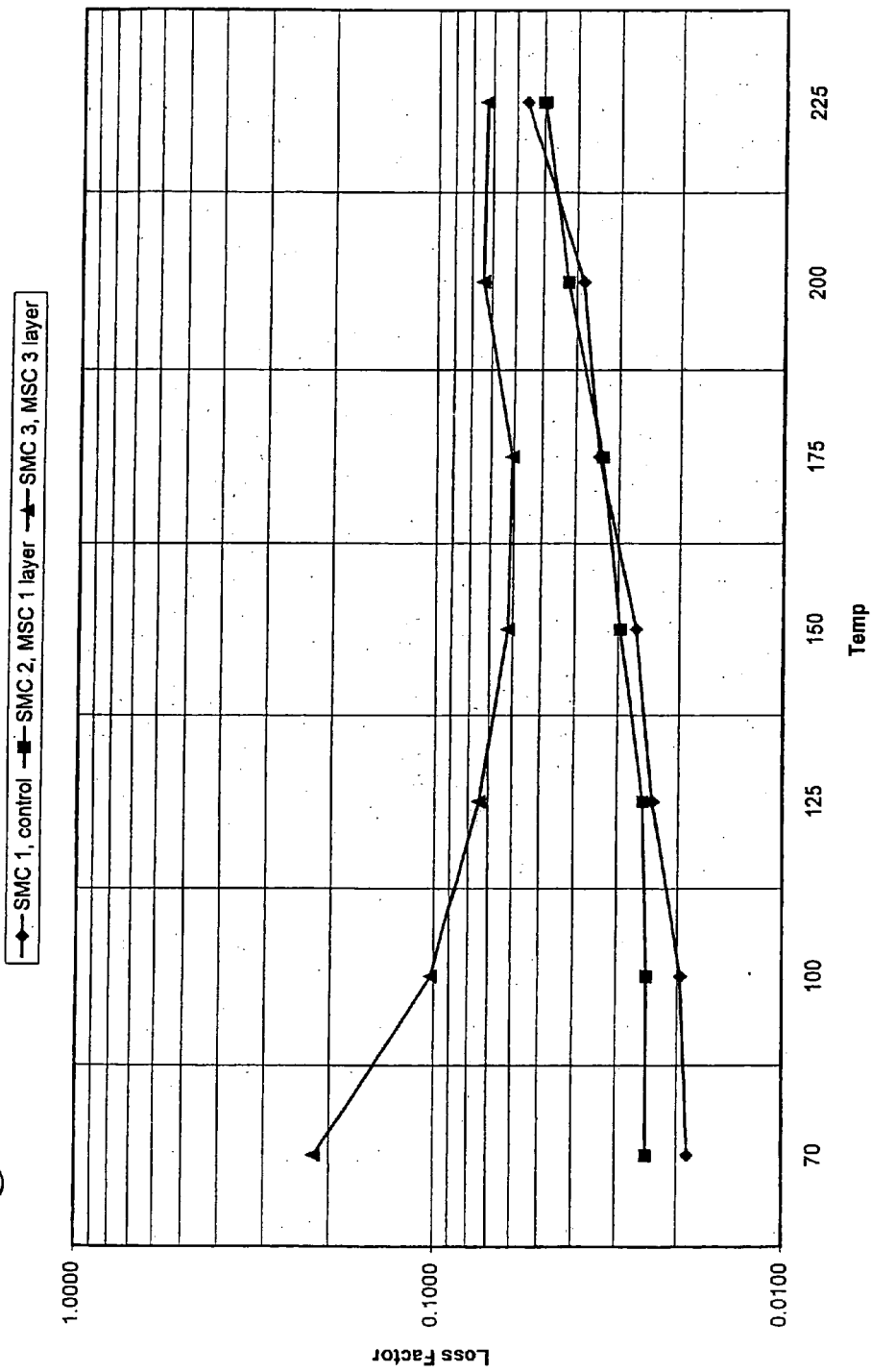
FIG. 15 and FIG. 16 each are graphs comparing the loss factors for Examples 7 and 8 and Comparative Example F over a temperature range.
Figure 16:
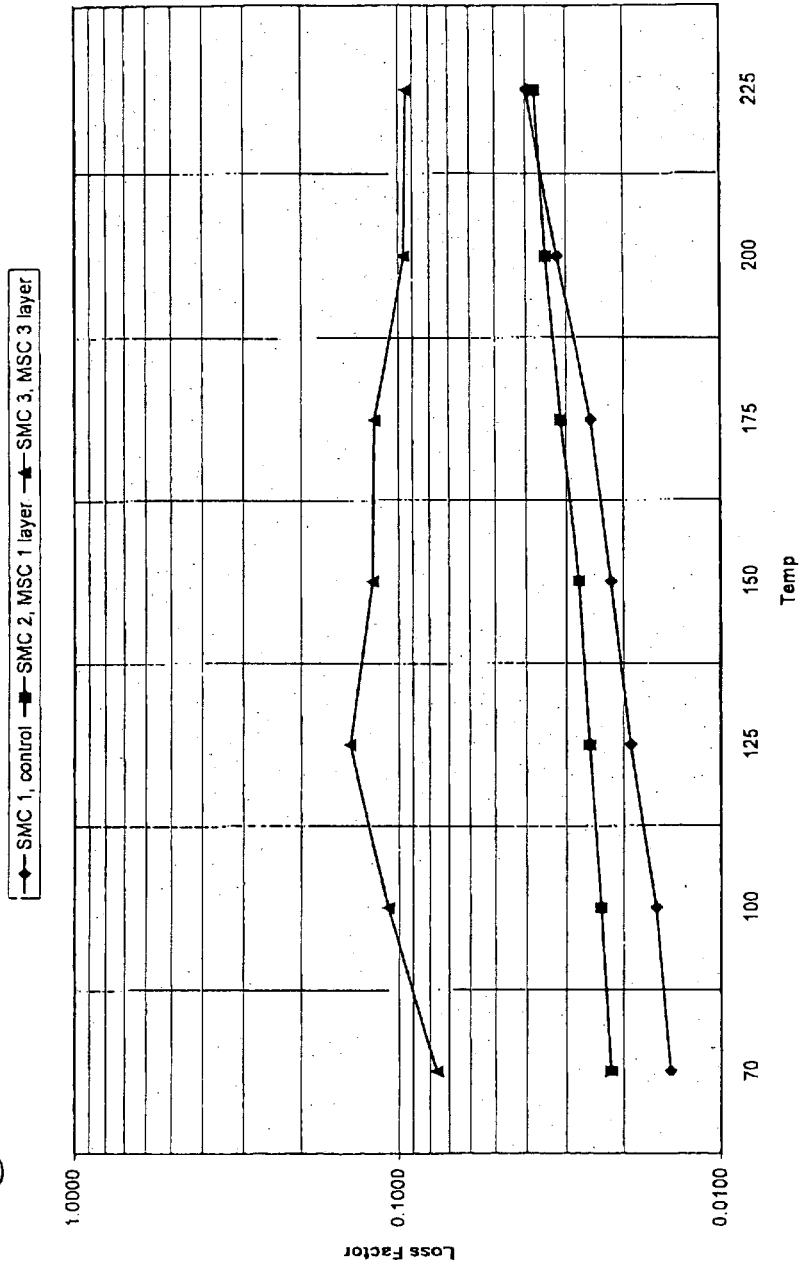

After molding, the laminates of Examples 7 and 8 (designated SMC 2 and SMC 3, respectively) and Comparative Example F (designated SMC 1, control) were subjected to two rounds of testing, and exhibited the following loss factors, which are illustrated in graphical form in FIGS. 15 and 16, respectively.

TABLE 6

(Loss Factor) for Examples 7 & 8 and Comparative Example F

| Temp. (° F.) | Testing Round 1 | | | Testing Round 2 | | |
|---|---|---|---|---|---|---|
| | Ex. 7 | Ex. 8 | Comp. Ex. F | Ex. 7 | Ex. 8 | Comp. Ex. F |
| 70 | 0.0244 | 0.221 | 0.0187 | 0.0218 | 0.0762 | 0.0144 |
| 100 | 0.0244 | 0.1022 | 0.0196 | 0.0234 | 0.108 | 0.0159 |
| 125 | 0.0252 | 0.0742 | 0.0236 | 0.0254 | 0.1412 | 0.0190 |
| 150 | 0.0296 | 0.0618 | 0.0266 | 0.0274 | 0.12 | 0.0218 |
| 175 | 0.0334 | 0.0606 | 0.0342 | 0.0312 | 0.1184 | 0.0252 |
| 220 | 0.0424 | 0.074 | 0.0382 | 0.0346 | 0.096 | 0.0320 |
| 225 | 0.0498 | 0.0728 | 0.0558 | 0.0374 | 0.0942 | 0.0398 |

Referring to Table 6, the laminate of Example 8 exhibited average loss factors of 0.0952 and 0.108 in rounds 1 and 2, respectively, compared to average loss factors of 0.0310 and 0.0240 for Comparative Example F. Hence, Example 8 exhibited 207% and 350% loss factor improvements over Comparative Example F for rounds 1 and 2, respectively.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A disc drive assembly comprising:
   a head disc assembly comprising a disc having a surface and a track for storage of information, a head for writing and reading information to and from the disc, and an actuator arm for moving the head relative to the surface of the disc;
   a housing comprising a base and a cover cooperating with one another to form a chamber therebetween in which at least a portion of the head disc assembly is housed; and
   a damper structure operatively associated with the housing for dampening noise and/or vibration emanated from the head disc assembly, the damper structure comprising
      a viscoelastic damper layer; and
      a continuous, polymeric constraining layer intimately contacting and encasing the viscoelastic damper layer, the constraining layer having a greater stiffness and higher modulus of dynamic shearing elasticity than the viscoelastic damper layer, the constraining layer being molded from a high density filler and a moldable compound that is immiscible with the viscoelastic damper layer to provide a discrete interface between the constraining layer and the viscoelastic damper layer.

2. A disc drive assembly according to claim 1, wherein the viscoelastic damper layer comprises a polymeric reaction product of a composition comprising a member selected from the group consisting of (meth)acrylic acid and (meth)acrylate.

3. A disc drive assembly according to claim 1, wherein the viscoelastic damper layer comprises a polyacrylate.

4. A disc drive assembly according to claim 1, wherein the viscoelastic damper layer comprises a member selected from the group consisting of nitrile rubbers and fluoroelastomers.

5. A disc drive assembly according to claim 1, wherein the viscoelastic damper layer is free of fillers.

6. A disc drive assembly according to claim 1, wherein the viscoelastic damper layer comprises a plurality of fragments that are noncontinuous with each other to provide interstices between the noncontinuous fragments.

7. A disc drive assembly according to claim 1, wherein the viscoelastic damper layer is continuous and non-fragmented.

8. A disc drive assembly according to claim 1, wherein the continuous constraining layer further comprises high density filler comprising a member selected from the group consisting of glass, carbon, aramids, metal, plastics, alumina, silica, silicon, ceramic, and graphite.

9. A disc drive assembly according to claim 1, wherein the constraining layer further comprises chopped fiberglass.

10. A disc drive assembly according to claim 1, wherein the modulus of dynamic shearing elasticity of the constraining layer is at least two orders of magnitude greater than that of the viscoelastic damper layer.

11. A disc drive assembly according to claim 1, wherein the modulus of dynamic shearing elasticity of the constraining layer is at least three orders of magnitude greater than that of the viscoelastic damper layer.

12. A disc drive assembly according to claim 1, wherein the modulus of dynamic shearing elasticity of the constraining layer is at least about 500,000 psi.

13. A disc drive assembly according to claim 1, wherein the modulus of dynamic shearing elasticity of the constraining layer is at least about 1,000,000 psi.

14. A disc drive assembly according to claim 1, wherein the constraining layer comprises a member selected from the group consisting of epoxy, polyurethane, polyester, acetal, polystyrene, acrylonitrile-butadiene-styrene, and polyvinylchloride.

15. A disc drive assembly according to claim 1, wherein the constraining layer comprises a polyester.

16. A disc drive assembly according to claim 1, wherein the damper structure is in intimate contact with an outer surface of the housing.

17. A disc drive assembly according to claim 1, wherein the damper structure is in intimate contact with an inner surface of the housing.

18. A disc drive assembly comprising:
   a head disc assembly comprising a disc having a surface and a track for storage of information, a head for writing and reading information to and from the disc, and an actuator arm for moving the head relative to the surface of the disc;
   a housing comprising a base and a cover cooperating with one another to form a chamber therebetween in which at least a portion of the head disc assembly is housed; and
   a damper structure operatively associated with the housing for dampening noise and/or vibration emanated from the head disc assembly, the damper structure comprising
      a viscoelastic damper layer; and
      a continuous, polymeric constraining layer intimately contacting the viscoelastic damper layer and molded from a high density filler and a melt-flowable polymer matrix that is immiscible with the viscoelastic damper layer to provide a discrete interface between the constraining layer and the viscoelastic damper layer, the constraining layer having a greater stiffness than the viscoelastic damper layer, a modulus of dynamic shearing elasticity of at least 500,000 psi and higher than the viscoelastic damper layer, and a density of at least 3.0 grams per cubic centimeter.

19. A disc drive assembly according to claim 18, wherein the viscoelastic damper layer comprises a polymeric reaction product of a composition comprising a member selected from the group consisting of (meth)acrylic acid and (meth)acrylate.

20. A disc drive assembly according to claim 18, wherein the viscoelastic damper layer comprises a polyacrylate.

21. A disc drive assembly according to claim 18, wherein the viscoelastic damper layer comprises a member selected from the group consisting of nitrile rubbers and fluoroelastomers.

22. A disc drive assembly according to claim 18, wherein the viscoelastic damper layer is free of fillers.

23. A disc drive assembly according to claim 18, wherein the viscoelastic damper layer comprises a plurality of fragments that are noncontinuous with each other to provide interstices between the noncontinuous fragments.

24. A disc drive assembly according to claim 18, wherein the constraining layer further comprises high density filler comprising a member selected from the group consisting of glass, carbon, aramids, metal, plastics, alumina, silica, silicon, ceramic, and graphite.

25. A disc drive assembly according to claim 18, wherein the constraining layer further comprises chopped fiberglass.

26. A disc drive assembly according to claim 18, wherein the modulus of dynamic shearing elasticity of the constraining layer is at least two orders of magnitude greater than that of the viscoelastic damper layer.

27. A disc drive assembly according to claim 18, wherein the modulus of dynamic shearing elasticity of the constraining layer is at least three orders of magnitude greater than that of the viscoelastic damper layer.

28. A disc drive assembly according to claim 18, wherein the constraining layer comprises a member selected from the group consisting of epoxy, polyurethane, polyester, acetal, polystyrene, acrylonitrile-butadiene-styrene, and polyvinylchloride.

29. A disc drive assembly according to claim 18, wherein the constraining layer comprises a polyester.

30. A disc drive assembly according to claim 18, wherein the density of the constraining layer is at least 5.0 grams per cubic centimeter.

31. A disc drive assembly according to claim 18, wherein the damper structure is in intimate contact with an outer surface of the housing.

32. A disc drive assembly according to claim 18, wherein the damper structure is in intimate contact with an inner surface of the housing.

* * * * *